US011169280B2

(12) United States Patent
Akpinar et al.

(10) Patent No.: US 11,169,280 B2
(45) Date of Patent: Nov. 9, 2021

(54) SYSTEMS AND METHODS FOR DIRECTION ESTIMATION IN INDOOR AND OUTDOOR LOCATIONS

(71) Applicant: Pointr Limited, London (GB)

(72) Inventors: Ismail Ege Akpinar, London (GB); Can Tunca, Istanbul (TR); Mehmet Can Akpinar, Istanbul (TR); Sinan Isik, Istanbul (TR)

(73) Assignee: POINTR LIMITED, London (GB)

(*) Notice: Subject to any disclaimer, the term of this patent is extended or adjusted under 35 U.S.C. 154(b) by 84 days.

(21) Appl. No.: 16/578,933

(22) Filed: Sep. 23, 2019

(65) Prior Publication Data

US 2020/0150283 A1 May 14, 2020

Related U.S. Application Data

(63) Continuation-in-part of application No. 16/399,241, filed on Apr. 30, 2019, now Pat. No. 11,029,415.
(Continued)

(51) Int. Cl.
*G01S 19/49* (2010.01)
*G01C 21/16* (2006.01)
*G01S 19/53* (2010.01)

(52) U.S. Cl.
CPC ............ *G01S 19/49* (2013.01); *G01C 21/165* (2013.01); *G01S 19/53* (2013.01)

(58) Field of Classification Search
CPC ....... G01S 19/49; G01S 19/53; G01C 21/165; G01C 21/20; G01C 21/206
See application file for complete search history.

(56) References Cited

U.S. PATENT DOCUMENTS 8,649,930 B2 2/2014 Reeve et al.
8,688,375 B2 * 4/2014 Funk .................... G08B 25/016
701/495
(Continued)

FOREIGN PATENT DOCUMENTS

CN 105737826 A 7/2016
CN 106441302 A 2/2017

OTHER PUBLICATIONS

Xiaoli Meng et al., Self-Contained Pedestrian Tracking During Normal Walking Using an Inertial/Magnetic Sensor Module, Mar. 2014, IEEE Transactions on Biomedical Engineering, vol. 61, No. 3, pp. 892-899. (Year: 2014).
(Continued)

*Primary Examiner* — Mischita L Henson
(74) *Attorney, Agent, or Firm* — Dickinson Wright PLLC; Mark E. Scott

(57) ABSTRACT

Direction estimation in indoor and outdoor locations. At least some of the example embodiments are computer-implemented methods including: determining, by a processor of a mobile device, that the mobile device is approaching a portal between a first navigation domain and a second navigation domain; displaying, on a display device of the mobile device, a merged map concatenating a map of the first navigation domain with a map of the second navigation domain; showing location of the mobile device on the map of the first navigation domain prior to the mobile device transiting through the portal; and then showing location of the mobile device on the map of the second navigation domain.

24 Claims, 13 Drawing Sheets

Related U.S. Application Data which is a continuation of application No. 16/189,520, filed on Nov. 13, 2018, now Pat. No. 10,324,197.

(56) References Cited

U.S. PATENT DOCUMENTS

| | | | |
|---|---|---|---|
| 2006/0125644 A1* | 6/2006 | Sharp | G01S 5/0263 340/573.1 |
| 2007/0250261 A1 | 10/2007 | Soehren | |
| 2009/0254276 A1 | 10/2009 | Faulkner et al. | |
| 2011/0172906 A1* | 7/2011 | Das | G01C 21/34 701/533 |
| 2013/0035110 A1* | 2/2013 | Sridhara | H04W 4/029 455/456.1 |
| 2013/0311134 A1 | 11/2013 | Kordari et al. | |
| 2014/0107919 A1* | 4/2014 | Venkatraman | G01C 21/20 701/466 |
| 2014/0288822 A1 | 9/2014 | Morrison et al. | |
| 2015/0350849 A1 | 12/2015 | Huang | |
| 2016/0069690 A1 | 3/2016 | Li et al. | |

OTHER PUBLICATIONS

Rommanee Jirawimut et al., A Method for Dead Reckoning Parameter Correction in Pedestrian Navigation System, Feb. 2003, IEEE Transactions on Instrumentation and Measurement, vol. 52, No. 1, pp. 209-215 (Year: 2003).

Feyissa Woyano et al., Evaluation and Comparison of Performance Analysis of Indoor Inertial Navigation System Based on Foot Mounted IMU, Jan. 31, 2016, ICACT2016, ISBN 978-89-968650-6-3, pp. 1 (Year: 2016).

International Searching Authority, Partial International Search Report and Provisional Opinion for related PCT Application PCT/EP2019/081242, dated Feb. 19, 2020; 31 pages.

International Searching Authority, Search Report and Written Opinion for related PCT Application PCT/EP2019/081242, dated Jun. 29, 2020; 20 pages.

* cited by examiner

SYSTEMS AND METHODS FOR DIRECTION ESTIMATION IN INDOOR AND OUTDOOR LOCATIONS

CROSS-REFERENCE TO RELATED APPLICATIONS

This patent application is a continuation-in-part of U.S. application Ser. No. 16/399,241 titled "Systems and Methods for Estimating Initial Heading at Start-Up of Navigation." The Ser. No. 16/399,241 patent application is a continuation of U.S. application Ser. No. 16/189,520 filed Nov. 13, 2018 titled "Systems and Methods for Estimating Initial Heading at Start-Up of Navigation" (now U.S. Pat. No. 10,324,197). Both applications are incorporated by reference herein as if reproduced in full below.

BACKGROUND

Navigation systems designed for vehicles use global positioning system (GPS) signals to find position and find a route to a destination. GPS-based systems are usually deployed in vehicles where main power supply is not restricted, and in most operational circumstances the vehicle is outdoors where the GPS receivers have direct "view" of the GPS satellites.

However when navigation is needed for a pedestrian many things change. For example, when navigating within an indoor area the hand-held computing device of the pedestrian may not be able to sense any GPS signals, and thus indoor navigation may be based on beacons disposed within the indoor area. Oppositely, when navigating outdoors the hand-held computing device of pedestrian may not be able to sense beacons from the indoor area, and thus outdoor navigation may be based on the GPS signals. Moreover, transitioning from indoor to outdoor, or outdoor to indoor, is difficult for related-art devices, as the two areas represent different navigation domains.

Notwithstanding the issues noted above, whether in vehicles or hand-held computing devices, GPS-based systems may take three to seven minutes to determine an initial heading, particularly if the GPS-based system has been moved to a new location since its last GPS-based position determination. Similarly, mobile devices determining position based on location information provided by beacon devices may take a minute or more to determine initial heading.

Further problems occur when seamless navigation is required in two domains; indoors and outdoors. Current systems require the user change devices or applications when moving from one domain to another. This is not only inconvenient but also does not allow the user to plan his/her journey and estimate walking times from one indoor location to another when there is an outdoor area in between.

BRIEF DESCRIPTION OF THE DRAWINGS

For a detailed description of example embodiments, reference will now be made to the accompanying drawings in which.

DEFINITIONS

Figure 1:
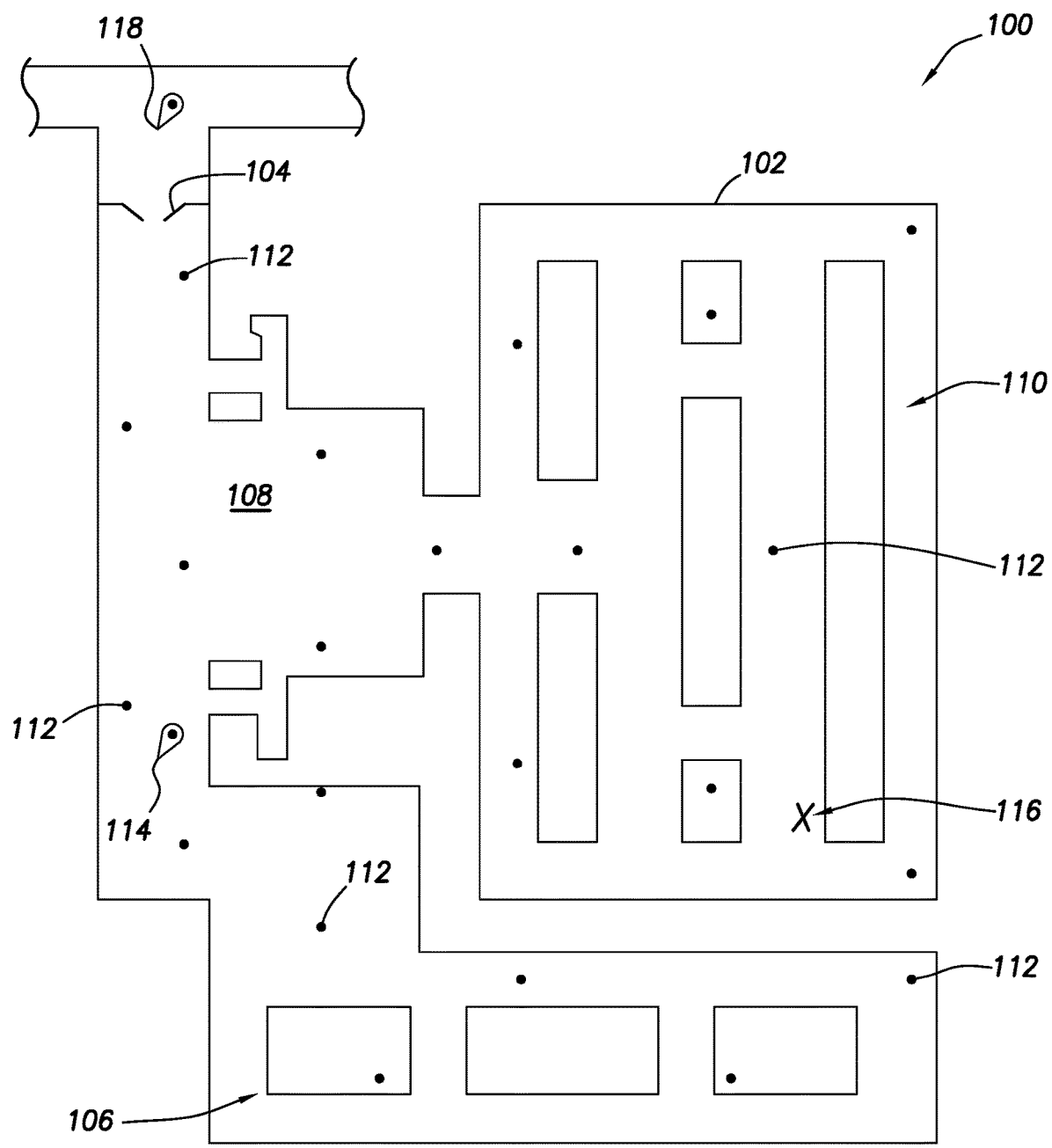
FIG. 1 shows an overhead view of an indoor venue in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" shall mean, alone or in combination, individual circuit components, an application specific integrated circuit (ASIC), a microcontroller with controlling software, a digital signal processor (DSP), a processor with controlling software on memory, and/or a field programmable gate array (FPGA), configured to read inputs and drive outputs responsive to the inputs.

"Navigation domain" shall mean an indoor area or outdoor area in which navigation is accomplished by lodestar devices placed for use in the area. For example, in an indoor area beacons may be placed to provide information used to navigate within the indoor area, and in an outdoor area GPS satellites may be used to navigate within the outdoor area. While some signals from the GPS satellites may be received within the indoor area (e.g., near a window or skylight), the signals from the GPS satellites are not suitable for navigation within a navigation domain that is indoor. Similarly, while some signals from beacon devices placed in an indoor area may be received outdoors (e.g., near a window or garage door), the signals from the beacons that are placed in the indoor area are not suitable for navigation within a navigation domain that is outdoor.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to navigation within and between navigation domains. More particularly, various example embodiments are directed to providing navigation information to a user of a hand-held computing device or a mobile device as the user transitions between navigation domains (e.g., transitioning from indoors to outdoors, or outdoors to indoors). The specification is conceptually divided into indoor navigation issues, outdoor navigation issues, and then to navigation when transitioning between navigation domains.

Indoor Navigation

FIG. 1 shows an overhead view of an indoor venue in accordance with at least some embodiments. In particular, FIG. 1 shows the layout 100 of an example indoor venue 102. A person may enter the indoor venue 102 through a portal illustratively shown as doors 104. Once inside, the person may want to navigate from the entry hall area 108 to the exhibition area 106 or exhibition area 110. Because the indoor venue 102 is indoors, a mobile device of a person may not be able to detected signals from global positioning system (GPS) satellites. In order to provide indoor navigation, the example indoor venue 102 has disposed therein a plurality of beacon devices 112. Not all beacon devices are numbered so as not to unduly complicate the figure. The beacon devices 112 may be placed at any suitable location, such as ceiling-mounted beacon devices, wall-mounted beacon devices, beacon devices mounted on structural pillars, and the like. Thus, the example indoor venue 102 represents a navigation domain where lodestar devices in the form of beacons provide navigation signals and/or data. The beacon devices 112 may take any suitable form, such as Bluetooth Low Energy (BLE) devices, or Ultra Wide Band (UWB) devices, available from many manufacturers. Moreover, location determinations may take any suitable form, such as triangulation, received signal strength indications (RSSI), and combinations.

Consider that user has entered the facility, is standing at location 114 in the entry hall 108, and would like to navigate to location 116 within exhibition area 110. The hand-held computing device or mobile device carried by the user has a navigation program that either knows in advance, or is provided upon request from the beacon devices 112 or a data network, the layout of the indoor venue 102. While the mobile device may know its initial location 114, the initial heading may not be known or there may be more than one viable solution based on the accuracy of the location data available at the time. If the navigation program makes an incorrect assumption about direction to travel from location 114, the user may travel a significant distance in the wrong direction (in the example, into exhibit area 106), before being given a correct heading to reach location 116 in exhibition area 110.

In related-art systems, the navigation platform may take several minutes to determine the initial heading, in which case the user may be walking in the wrong direction (e.g., towards exhibit area 106 rather than exhibition area 110 in this example) before the navigation platform can resolve an initial heading. While most related-art systems focus on increasing accuracy of triangulation methods, none of the related-art systems have paid sufficient attention to reducing the time required to compute the initial heading. Nor have the related-art systems paid attention to increasing the accuracy of initial heading so that the user is directed correctly as soon as navigation program starts. Some related-art systems use particle filters for navigation algorithms, particularly in robots, vehicles, and other types of machines. For such related-art navigation platforms to work accurately and responsively, the navigation platforms need to generate, maintain, and follow in excess of 10,000 particle filters. Maintaining and harvesting data from 10,000 particle filters consumes significant power resources, making such methods unsuitable for mobile devices. For this reason alone, use of particle filters is not viable on mobile devices. Another important point to consider is that particle filters perform well in estimating position, but not heading or heading change. Walking users are more likely to change heading suddenly than vehicles. Therefore, if the user changes heading suddenly, particle filters would take significant time to realize the change in heading. Another major disadvantage of particle filter systems is that the process is stochastic and not deterministic. Feeding the same data to a stochastic process may yield different results each time. This is totally unacceptable for pedestrians.

By contrast, example embodiments are directed to systems and methods for estimating initial direction at start-up of navigation. More particularly, example embodiments are directed to determining initial heading of a mobile device by not assuming any initial heading; rather, example methods spawn a plurality of clone processes that are initially given identical locations and identical speeds, and with each clone process assigned or given a unique direction. The clone processes, in some cases Kalman filters, and in a particular case extended Kalman filters, each calculate a respective position after a frame period. In some cases, each clone process performs multiple location calculations during the frame period by being provided speed and heading change information multiple times during the frame period. Eventually the mobile device determines a new position indication (likely with higher accuracy than the first position indication) that too is passed to the clone processes. Each clone process calculates metrics related to the respective position and the actual position, and clone processes whose assigned directions are sufficiently different than the actual direction of travel are terminated, resulting in remaining clone processes. When the remaining clone processes sufficiently agree, an initial heading is thus established. In example embodiments the initial heading is determined in two seconds or less, and in some cases one second or less.

Mobile devices and computer systems, prior to the innovations described herein, were unable to resolve initial heading quickly enough to be useful for deriving initial navigation directions, many times resulting in navigation platforms providing incorrect navigation directions that many times were not corrected for five minutes or more. The improvements discussed herein thus improve the operation of the computer systems and mobile devices. Moreover, improvements discussed herein improve another technological field of computer-assisted navigation. The specification now turns to an example mobile device which may implement the various embodiments.

Figure 2:
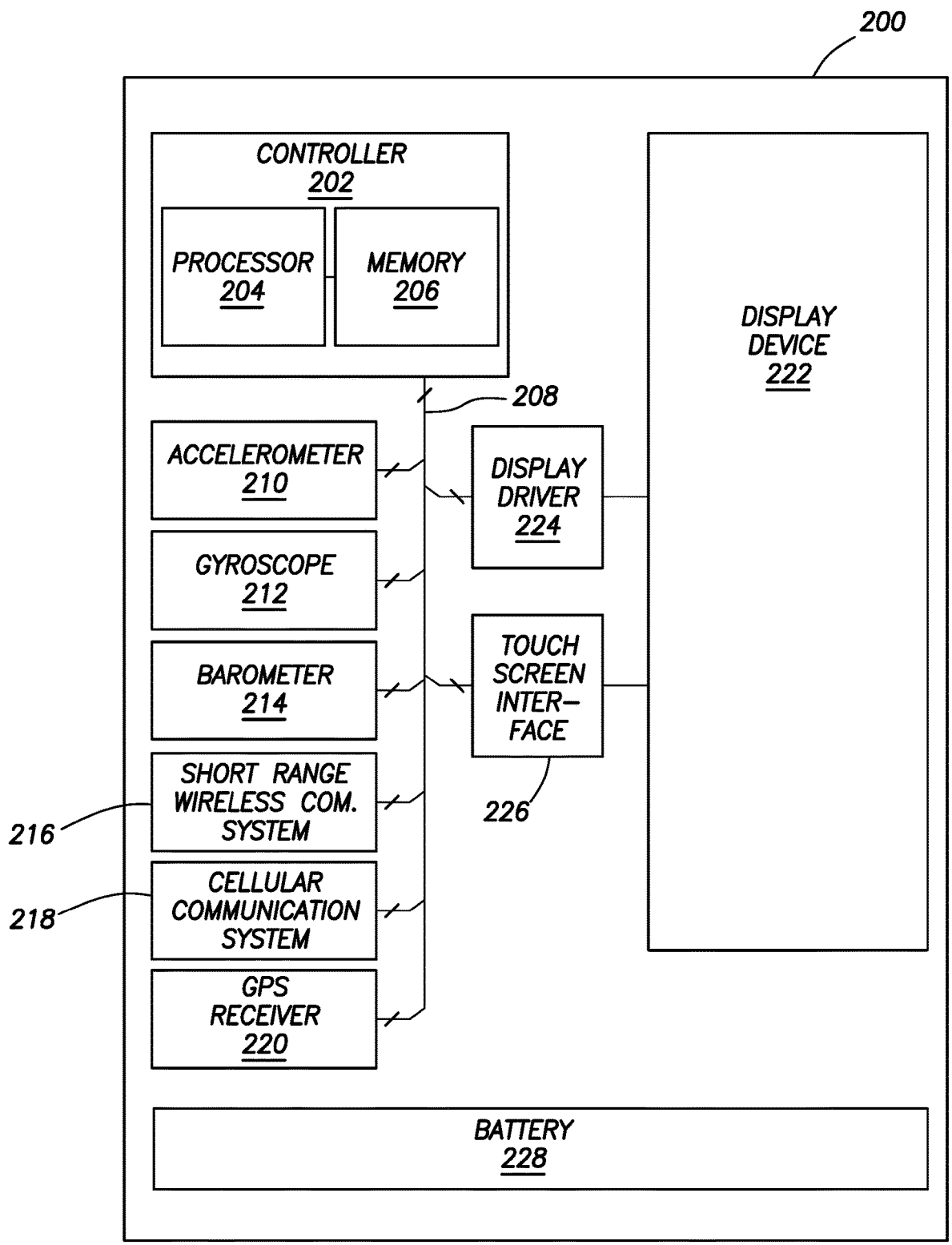
FIG. 2 shows a block diagram of a mobile device in accordance with at least some embodiments.

FIG. 2 shows a block diagram of a hand-held or mobile device in accordance with at least some embodiments. In particular, FIG. 2 shows example mobile device 200 comprising a controller 202. The controller 202 takes any suitable form, such as an application specific integrated circuit (ASIC), a microcontroller with controlling software, a digital signal processor (DSP), a processor with controlling software, a field programmable gate array (FPGA), or combinations thereof, configured to read inputs and drive outputs responsive to the inputs. In the system of FIG. 2, the controller 202 is implemented in the example form of a processor 204 coupled to a memory 206. The controller 202 couples to host of internal components and devices by any suitable direct connection or bus system, as shown by the example internal bus 208.

The example mobile device 200 comprises an accelerometer 210 electrically coupled to the controller 202 by way of the internal bus 208. The accelerometer 210 may take any suitable form, such as a single-axis accelerometer, or multi-axis accelerometer. In a particular example, the accelerometer 210 is a three-axis accelerometer such that the mobile device 200 may be able to determine acceleration in any dimension (e.g., movement in the horizontal plane along with how much the user "bounces" for each step taken). In other cases the accelerometer 210 may be one or more velocity meters, from which acceleration can be mathematically determined.

The example mobile device 200 further comprises an electronic gyroscope 212 electrically coupled to the controller 202 by way of the example internal bus 208. The gyroscope 212, standing alone, may not be able to provide a heading relative to a coordinate system (e.g., relative to magnetic North) unless the data from the gyroscope 212 is combined with other data. However, the gyroscope 212 can be used to create accurate indications of heading change even when the absolute heading is not known.

The example mobile device 200 further comprises a barometer 214 electrically coupled to the controller 202 by way of the example internal bus 208. The barometer 214 may be used to read barometric pressure, which is indicative of the elevation. Of course, barometric pressure is also influenced by high and low pressure weather patterns; however, frequent readings of the barometer are much less likely to be influenced by weather, especially when relative elevation changes are used. Further, the data from the barometer 214 may need to be combined with other data for absolute elevation determinations.

The example mobile device 200 further comprises a short-range wireless communication system 216 coupled to the controller 202 by way of the example internal bus 208. The short-range wireless communication system 216 may take any suitable form and protocol, such as Bluetooth, Ultra Wide Band (UWB), or any of the various WIFI protocols, such as IEEE 802.11. The processor 204, executing a program, may read from the short-range wireless communication system 216 digital values indicative of current location of the mobile device 200 or digital values of Time of Flight or Angle of Arrival values to aid in calculation of location. In example embodiments, the mobile device 200 receives data from beacon devices 112 (FIG. 1) as part of providing navigation services to the user of the mobile device 200.

The example mobile device 200 further comprises a cellular communication system 218 electrically coupled to the controller by way of the example internal bus 208. The cellular communication system 218 wirelessly communicates with cell towers to provide voice and data services. In example embodiments, maps of venue or areas (e.g., maps of indoor venues (such as indoor venue 102 (FIG. 1)) may be downloaded using the data aspects of the cellular communication system 218. The maps may also be downloaded by use of the short-range wireless communication system 216 in addition to, or in place of, the cellular communication system 218.

The example mobile device 200 further comprises a GPS receiver 220 electrically coupled to the controller 202 by way of the internal bus 208. The GPS receiver 220 or a similar location engine calculates a geographical location (or series of geographic locations for moving devices). In example embodiments, GPS receiver 220 may receive signals from one or more satellites orbiting the earth via an antenna (not specifically shown) that is tuned to the frequencies transmitted by the one or more satellites. GPS receiver 220 may analyze the received signals to create location data indicative of a current location of mobile device 200. Thus, the processor 204, executing a program, may read from the GPS receiver 220 digital values indicative of current location of the mobile device 200. In other cases, the GPS receiver 220 provides data to the processor 204 executing a program, and the processor 204 analyzes the data to determine location of the mobile device 200.

The example mobile device 200 further comprises a display device 222 electrically coupled to the controller 202 by way of display driver 224. As the name implies, the display driver 224 takes data provided by the controller 202 (e.g., maps, graphical indications of direction to travel) and displays the information on the display device 222 for the user. In some example systems, the display device 222 is covered by or integrated with a touch screen system (not specifically shown). The controller 202 may interface with the touch screen system by way of touch screen interface 226. Thus, using the touch screen system and the touch screen interface 226, the controller 202 may receive information from the user, such as by way of keyboard implemented using the display device 222. In other cases, the mobile device 200 may implement a physical keyboard in addition to, or in place of, the touch screen system and touch screen interface 226.

Finally, the example mobile device 200 comprises a battery 228. The battery 228 provides power to all of the noted internal components, but the electrical connections to the battery 228 are not shown so as not to unduly complicate the drawing. The battery 228 may take any suitable form, such as a lithium-ion battery, but any currently available or after-developed battery technology may be used. Thus, the mobile device 200 may be any currently available mobile device (e.g., APPLE® brand iPhones available from Apple, Inc., or ANDROID® brand devices available from Google, Inc.) or any after-developed hand-held computing device or mobile device. The discussion now turns to a software environment in which the example embodiments of indoor navigation are operated, and it will be understood the various pieces of the software that make up the software environment may be executed by the controller 202, and in specific examples stored on the memory 206 and executed by the processor 204.

Figure 3:
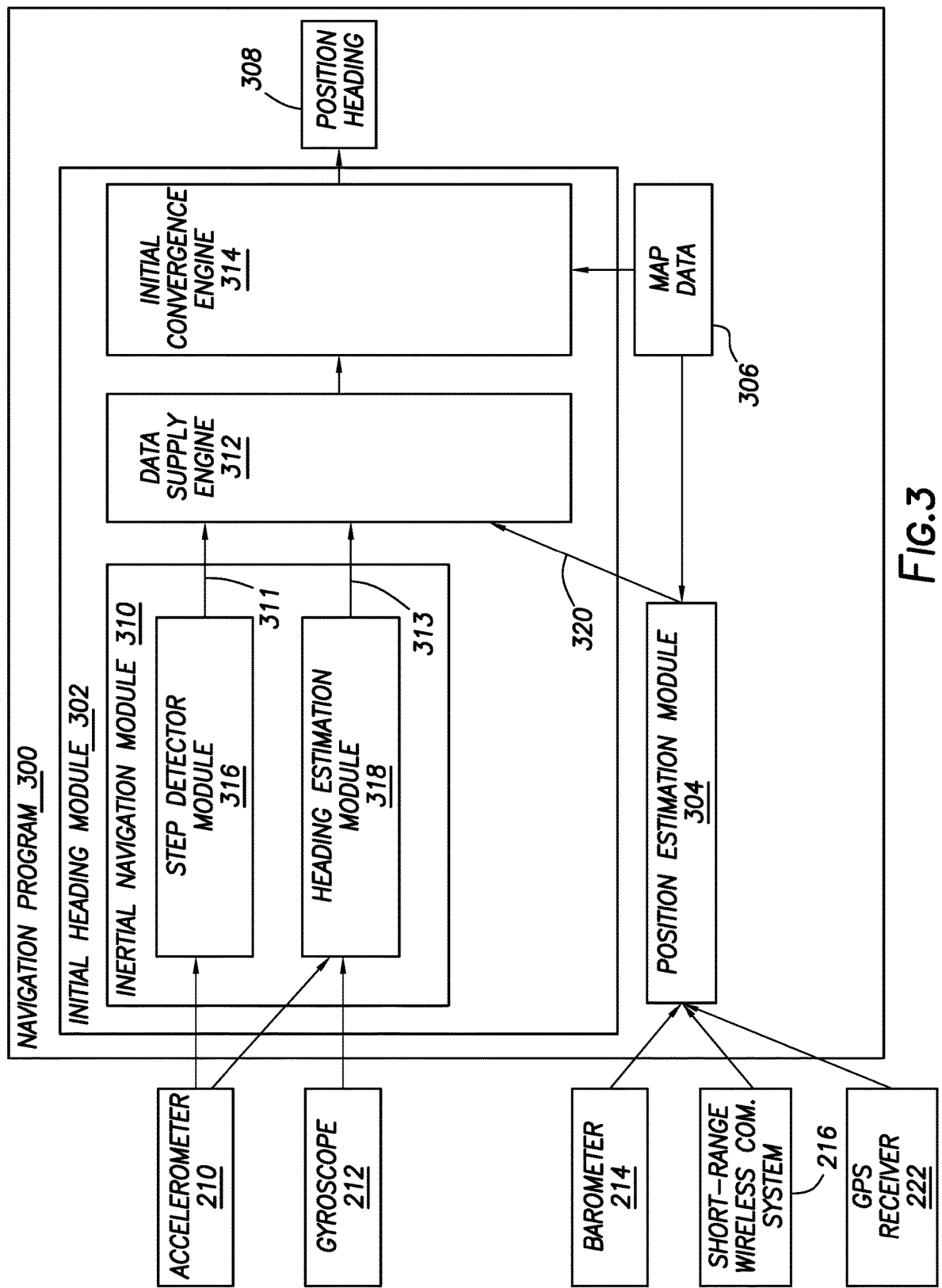
FIG. 3 shows a block diagram of a navigation program in accordance with at least some embodiments.

FIG. 3 shows a block diagram of a navigation program in accordance with at least some embodiments. In particular, FIG. 3 shows that navigation program 300 interfaces with various devices of the mobile device 200 (FIG. 2), such as the accelerometer 210, gyroscope 212, barometer 214, short-range wireless communication system 216, and GPS receiver 220. The navigation program 300 may provide to the user navigation information, such as by placing that navigation information on the display device 222 of FIG. 2. The example navigation program 300 is conceptually, though not necessarily physically, divided into a plurality of modules and data engines. In particular, the example navigation program 300 comprises an initial heading module 302 which, as the name implies, is designed and programmed to determine or estimate the initial heading of the user in startup situations, and as we shall see situations where the user makes abrupt direction changes. The initial heading module 302 reads or takes input from the accelerometer 210 and the gyroscope 212. In cases where the mobile device 200 does not have a gyroscope 212, a magnetometer may be substituted. If a mobile device 200 has both a gyroscope 212 and magnetometer, example embodiments use only the gyroscope 212 to the exclusion of the magnetometer. The initial heading module 302 further receives data indicative of position (hereafter just position data) from other portions of the navigation program 300. In the example environment of FIG. 3, the position data is provided from a position estimation module 304, and in particular the position estimation module 304 periodically (e.g., once every second) provides position data to the initial heading module 302. The initial heading module 302 further receives map data 306 from the navigation program 300, such as map data downloaded through the cellular communication system 218 (FIG. 2) or read through the short-range wireless communication system 216. Finally, the initial heading module 302 outputs or provides position and heading 308 to the navigation program 300, which may be used to provide directions to the user of the mobile device 200.

In example embodiments, the initial heading module 302 is conceptually, though not necessarily physically, divided into a plurality of underlying modules and engines. For example, the initial heading module 302 may comprise an inertial navigation module 310, a data supply engine 312, and an initial convergence engine 314. Each will be addressed in turn, starting with the inertial navigation module 310. The example inertial navigation module 310 takes input from the accelerometer 210 and gyroscope 212, and produces data indicative of speed (hereafter just speed data) of the mobile device 200 (FIG. 2) and thus user, as shown by arrow 311. The inertial navigation module 310 also produces data indicative of heading change (hereafter just heading change data) of the mobile device 200, as shown by arrow 313. That is, the heading change data may include a numerical value that indicates the change in heading that has occurred since the immediately previous numerical value (e.g., +10 degrees, −20 degrees). Thus, the heading change data is, in some embodiments, not a direct indication of direction; rather, the heading change data merely shows how much heading has changed since the immediately previous heading change data was provided. The inertial navigation module 310 produces updated speed data and heading change data multiple times within a frame period (e.g., a frame period of one second).

For reasons that will become clearer below, the functionality of the inertial navigation module 310 is conceptually divided into a step detector module 316 and a heading estimation module 318. As the names imply, the step detector module 316 determines or calculates speed data based on detecting steps taken by the user of the mobile device 200 (FIG. 2). In some example systems, the step detector module 316 takes into account information about the user and/or the venue (e.g., indoor venue 102 (FIG. 1)) when calculating stride length as part of generating speed data. Heading estimation module 318 is primarily concerned with creating the heading change data based on data from the accelerometer 210 and gyroscope 212.

Still referring to FIG. 3, the initial heading module 302 again comprises the data supply engine 312. The data supply engine 312 receives as input speed data and heading change data from the step detector module 316 and heading estimation module 318, respectively. The speed data and heading change data may arrive at the data supply engine 312 multiple times within a frame period. For example, if a frame period is one second, the data supply engine 312 may receive ten or more updates of speed data and heading change data within the one second frame period. The data supply engine 312 further receives as input data indicative of actual position (hereafter just actual position) from the navigation program 300, and specifically the position estimation module 304. The data supply engine 312 is designed and programmed to ensure the data makes logical sense before being passed to the initial convergence engine 314.

The internal workings of the initial convergence engine 314 are discussed in greater detail below. Nevertheless, the initial convergence engine 314 receives the speed data, heading change data, and when available updates to the actual position. Moreover, the initial convergence engine 314 receives map data 306. The initial convergence engine spawns a plurality of clone processes, and terminates clone processes whose unique direction fails to sufficiently match the actual direction. The initial convergence engine 314 determines the initial heading of the mobile device 200 (FIG. 2) based on remaining clone processes, and passes the initial position and heading 308 to the navigation program 300.

Position estimation module 304 may receive as input: barometric pressure data from the barometer 214; location information through the short-range wireless communication system 216 (e.g., location information from beacon devices 112 (FIG. 1)) when indoors; and location information from the GPS receiver 220 when outdoors. The position estimation module 304 is shown outside the initial heading module 302 to signify that any currently available or after-developed position estimation methodology may be used. For indoor navigation, the position estimation module may use a triangulation method and/or a RSSI method to determine location. For outdoor navigation, the position estimate module may directly receive location (based on GPS signals) or may calculate position based on timing of arrival and/or signal strength of each GPS signal. Each location estimation takes a finite time to perform, and thus in some cases the actual position 320 estimated and supplied to the data supply engine 312 may be provided once every frame period. In some example systems, the frame period is defined by the rate at which the position estimation module 324 can generate updated actual positions, such as once a second.

Still referring to FIG. 3, and returning to the step detector module 316. In accordance with example embodiments, average speed in a time interval is calculated by dividing total displacement of the mobile device 200 by the time interval. Displacement of the mobile device 200 may be obtained by processing accelerometer data. When the user of the mobile device 200 walks, periodic variations are detected by accelerometer 210. By performing peak detection, steps are detected in real time. For each detected step, a dynamic calculation formula of step length based on a human's walking features is performed. While any of a variety of models for calculating speed may be used, in example cases the Scarlet Model is used. The Scarlet Model considers variations due to different users, different paces of the same user, and stride lengths of the same user. In the Scarlet Model, the step length is calculated by using the following formula:

$$L_{Scarlet} = k \frac{\frac{\sum_{i=1}^{N} |a_i|}{N} - a_{min}}{a_{max} - a_{min}} \quad (1)$$

where $L_{Scarlet}$ is the calculated step length, N represents the number of acceleration sampling points during a step, $a_i$ is the acceleration in one sampling process, $a_{max}$ and $a_{min}$ are the maximum and minimum value, respectively, of the acceleration in vertical direction during a step, and k is a constant. Using the Scarlet Model each step is converted to step length and hence to displacement of the user and the mobile device. The speed of the mobile device 200 (FIG. 2) may thus be determined by the summation step lengths divided the time period.

The constant k may be determined experimentally by modelling the user's behavior. In accordance with at least some embodiments, accuracy of Scarlet Model is enhanced by determining the constant k for a particular user. That is, the constant k may be personalized and adapted to the user. The mobile device 200 (FIG. 2) learns and adapts k for the person and/or the environment. Further, the more the user deploys the navigation program 300, the better the constant k becomes for the particular user. That is to say, in example systems the inertial navigation module 310 modifies the stride length, and in particular the constant k, based on data regarding the user or person carrying the mobile device 200.

In accordance with yet still further embodiments, accuracy of the example Scarlet Model is enhanced by modifying the constant k for a particular location or venue. That is, the user's pace and strides change depending on location or venue. For example, some users walk faster outdoors or at the airports, and some users stroll in shopping centers. Thus, in some embodiments the mobile device 200, and more particularly the step detector module 316 may: modify the constant k to modify the stride length based on data regarding the location or venue within which the user and mobile device are moving; and/or modify the constant k to modify the stride length based on data received from a lodestar device (e.g., a beacon device 112 (FIG. 1) within the venue, or GPS signal). Stated otherwise, in some example systems and methods, changes to the value of the constant k are made depending based on: user dependent data; deployment of data over time; location; and/or venue and user adapted data.

Still referring to FIG. 3, and specifically the heading estimation module 318. To compute heading change in specific time intervals, readings from both the accelerometer 210 and gyroscope 212 may be made, and those readings fused to compute an attitude (e.g., 3-dimensional orientation) of the mobile device 200 (FIG. 2). The attitude may be then projected onto the ground-tangential plane to extract the two-dimensional heading. The heading change is then computed by determining a difference of the heading values of two consecutive heading values. In at least some embodiments, the fusion is performed using a Kalman filter or a complementary filter. In some mobile devices Kalman filter use less power. A specific filtering method may be selected by the heading estimation module 318 based on an identification of mobile device 200. Optimizing the application for the device reduces power usage significantly. In some systems, to increase accuracy the magnetometer is not used (even if present), as magnetometer readings are affected by environmental factors, such as iron, steel blocks, and computers by power cables. Data from a magnetometer is used only if the mobile device does not have a gyroscope.

Figure 4:
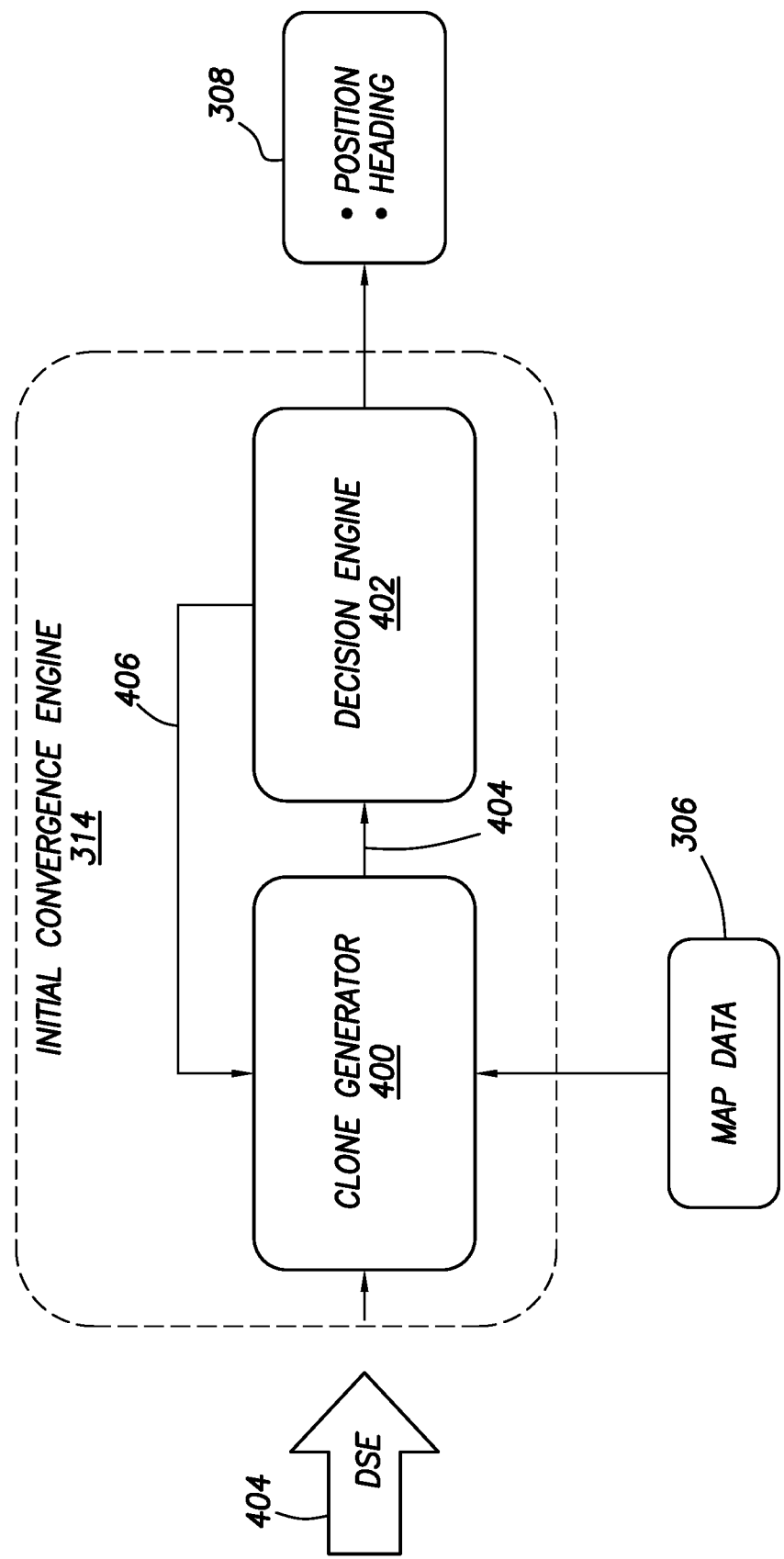
FIG. 4 shows a block diagram of the internal components of the initial convergence engine.

FIG. 4 shows a block diagram of the internal components of the initial convergence engine. In particular, the initial convergence engine 314 may be conceptually, though not necessarily physically, divided into a clone generator 400 and a decision engine 402. As will be discussed in greater detail below, the clone generator 400 receives speed, heading change, and in some cases position from the data supply engine 312 (FIG. 3), and as shown by arrow 404. Moreover, the clone generator 400 receives map data 306 from the navigation program 300. The clone generator 400 spawns clone processes and "distributes" the clone processes across a swath of directions (e.g., covering 360 degrees). Stated differently, each clone processes is given an identical initial location and speed, and each clone process given a unique direction. In some cases, the clone generator 400 refrains from spawning clone processes whose unique directions are toward obstacles, such as walls, pillars and other obstacles. In an open space with no close obstacles, the clone generator 400 may spawn 120 clone processes with unique directions spanning 360 degrees. In many cases, the unique directions of the clone processes may be evenly spread about the span of directions. For example, in the case of 120 clone processes spanning 360 degrees, the unique direction of each clone process may be three degrees from the unique direction of its nearest neighbor clone processes. In cases where the initial heading may be partially known (e.g., an abrupt turn by the user), the clone generator 400 may spawn clone processes along a smaller span of headings, such as clone processes spanning a range of headings greater than 90 degrees, but less than 270 degrees, or less than 180 degrees. While the developmental context is spawning clone processes in two dimensions, one having ordinary skill in art, with the benefit of this disclosure, could easily extend the idea of spawning clone processes in three-dimensional space (e.g., aviation context) for higher accuracy.

The decision engine 402 is the authority that makes survival decisions regarding the clone processes, and at the appropriate times makes the determination regarding the initial heading of the mobile device 200 (FIG. 2). Example internal workings of the decision engine 402 are described after a more thorough description of the clone processes and lifespan thereof.

Figure 5:
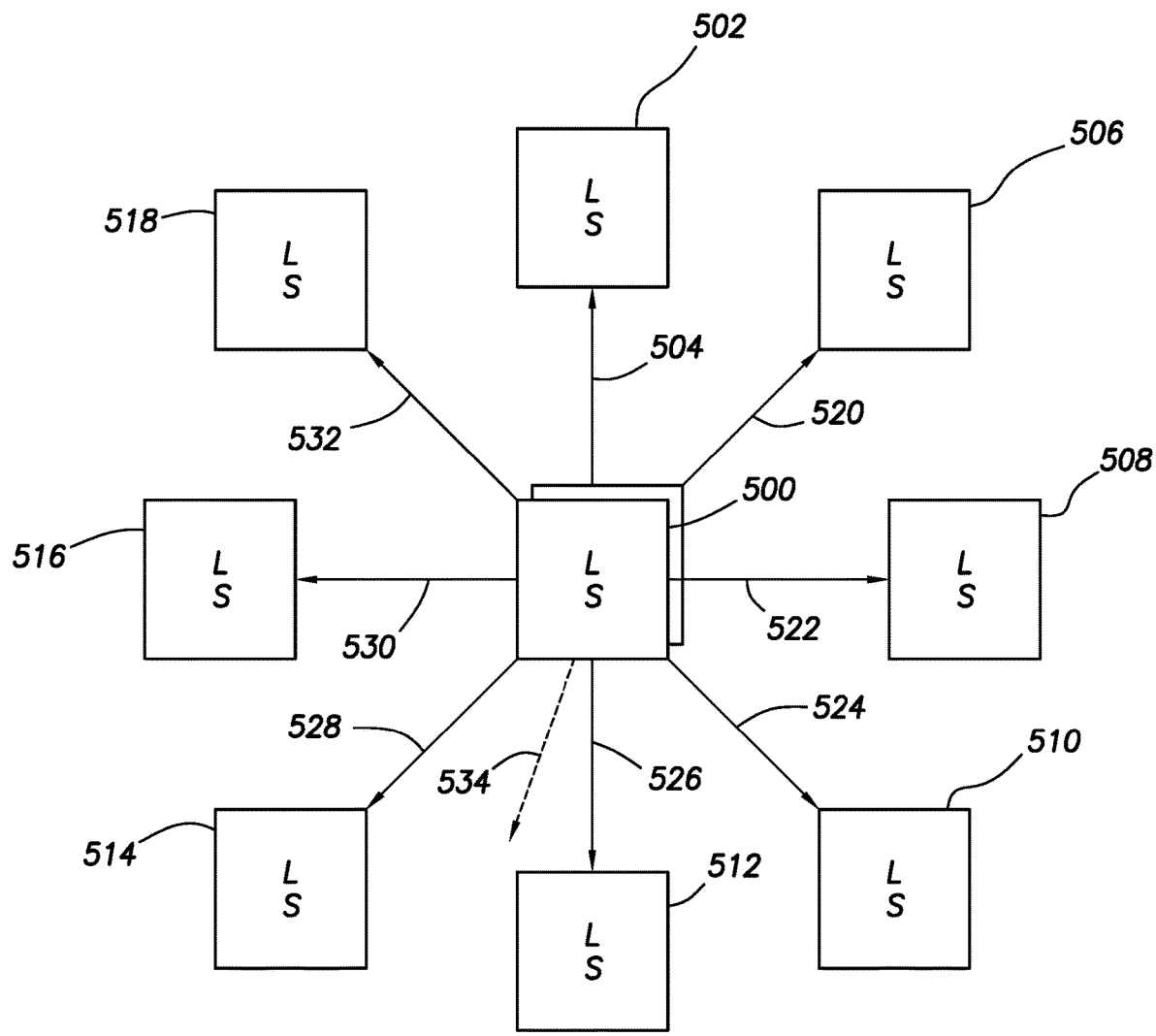
FIG. 5 shows an overhead conceptual view of spawning clone processes in accordance with at least some embodiments.

FIG. 5 shows an overhead conceptual view of spawning clone processes in accordance with at least some embodiments. In particular, FIG. 5 shows spawning or creation process in an example two-dimensional space with no obstacles in the immediate vicinity. Moreover, FIG. 5 shows two distinct points in time, with the center blocks representing location of the clone processes when initially spawned, and the outer ring of blocks a finite time after creation. In example embodiments, when the initial heading module 302 (FIG. 3), and particularly the initial convergence engine 314 (again FIG. 3) is called or executed, the initial convergence engine 314 creates or spawns a plurality of clone processes 500. Each clone process is given an initial identical location L and identical initial speed S, and each clone process given a unique direction. In the conceptual example of FIG. 5, the clone processes 500 at creation are all "located" in the same place in the middle of the figure, and thus not all the clone processes are visible. The "L" and "S" inside the upper most clone process 500 signify the location and speed. The unique direction of each clone process is shown by the radial arrows. That is, in the example of FIG. 5, eight clone processes are created with eight unique directions spanning 360 degrees. FIG. 5 uses eight clone processes so as not to unduly complicate the figure, but in practice for unique directions spanning 360 degrees, 120 clone processes may be used.

The location and speed data is provided to the clone processes 500 from the data supply engine 312 (FIG. 3). Note, however, that while the data supply engine 312 passes along heading change data, the heading change data may be ignored or discarded at the point in the time that the clone processes are created. Rather, each clone processes is assigned a unique direction within a range of headings (again here, spanning 360 degrees).

Each clone process then calculates a respective position at the end of a period of time, such as a frame period. That is, given the initial location and speed data, each clone process calculates a how far the clone process "moves" during the frame period based on the initial location, speed data, and unique direction. For example, clone process 502 calculates a new location (i.e., respective position) a distance along the unique direction 504 given the speed, to arrive at the new location as conceptually shown in FIG. 5. The same process is carried out by all the example clone processes 506, 508, 510, 512, 514, 516, and 518 along their respective unique directions 520, 522, 524, 526, 528, 530, and 532.

Each clone process is a software construct, not an actual device moving the two- or three-dimensional space. In some cases, each clone process may be an entry in a data table, and the table is updated with updated speed data, heading change data, and position. In other cases, such as mobile devices 200 (FIG. 2) having multi-threaded processors, each clone process may be a separately executed thread of the processor communicating through inter-process communication (IPC) calls to the other modules and engines.

Still referring to FIG. 5, each time the data supply engine 312 (FIG. 3) provides updated speed data and heading change data, each clone process utilizes the updated speed data and heading change data to calculate new respective locations. FIG. 5, however, does not show a second location calculation so as not to unduly complicate the drawings. The data supply engine 312 periodically supplies actual location data to the clone processes, for example, once every frame period. That is, speed data and heading change data may be provided more often than actual location. Nevertheless, when a clone process receives actual location data, the clone process calculates one or more metrics that may be used in termination decisions regarding the clone. For example, each clone process may calculate a separation between the respective position and the actual position. In other cases, each clone process may determine a distance or gap between the respective position and a nearby obstacle. Other metrics related to the clone processes being Extended Kalman Filters (discussed more below) may also be calculated.

The example system and method terminates clone processes whose metrics indicate the clone process does not show sufficient correlation to the actual heading. For example, if the separation between the respective position and the actual position is outside a separation threshold, the clone process is terminated. As another example, if the gap between the respective position and an obstacle is less than a gap threshold, the clone process is terminated.

Consider, for purposes of explanation, that the actual heading is between unique directions 526 and 528, such as actual heading 534. The metrics regarding correlation with respect to the actual heading 534 will be greater for clone processes whose unique directions are closer to the actual heading 534. Oppositely, the metrics regarding correlation with respect to the actual heading 534 will be less for clone processes whose unique directions are farther or opposite actual heading 534. Thus, some of the example clone processes of FIG. 5 will be terminated, such as clone processes 502, 506, and 518. The process may thus continue for one or more frame periods, each time narrowing the number of clone processes, where the unique directions of the remaining clone processes are indicative of the actual heading 534.

Figure 6:
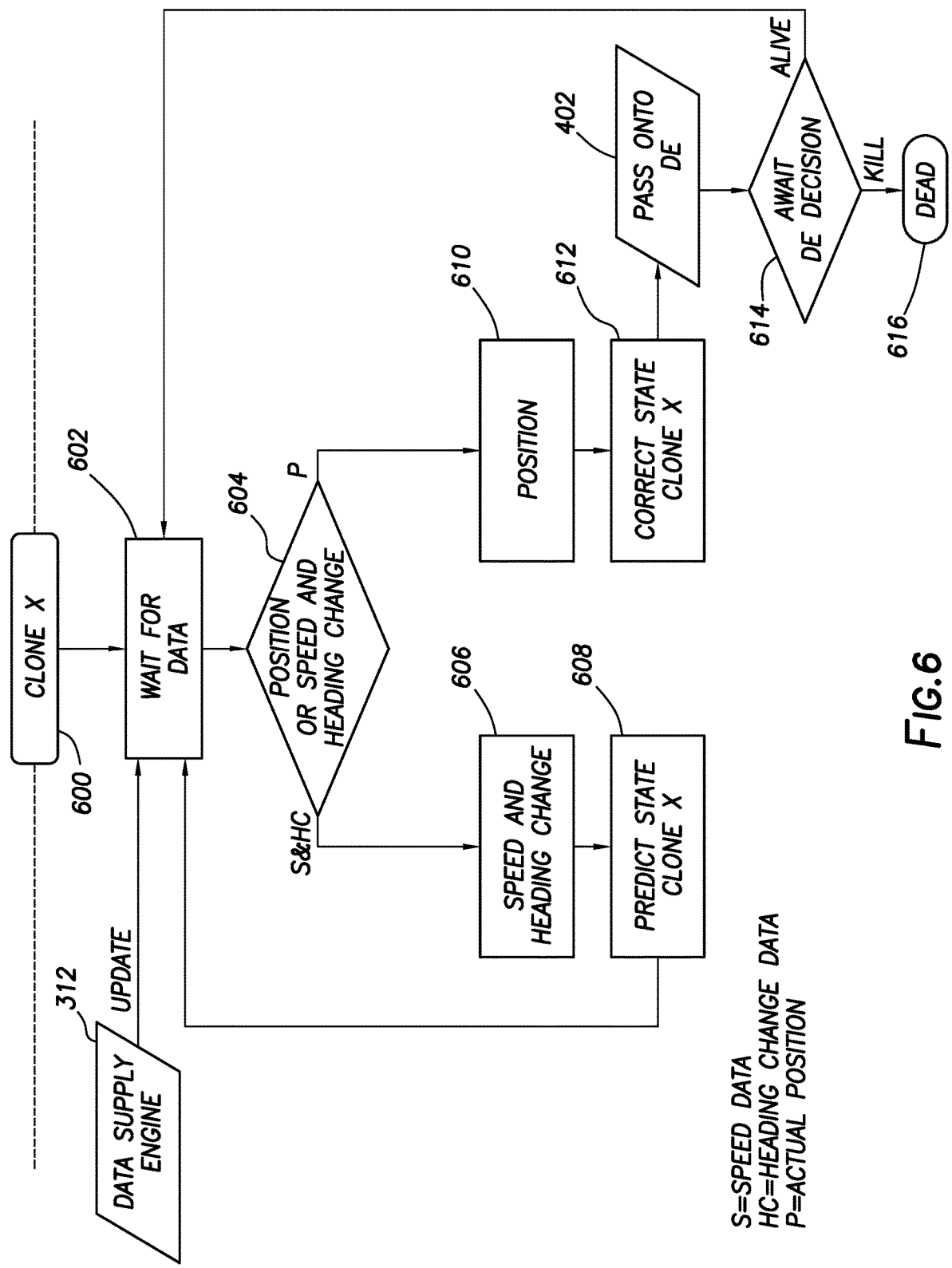
FIG. 6 shows a flow diagram of a single clone process in accordance with at least some embodiments.

FIG. 6 shows a flow diagram of a single clone process in accordance with at least some embodiments. In particular, the clone process X (in the figure "clone x") is created or spawned with an initial speed, initial position, and unique heading (block 600). Thereafter, the example clone process waits for an update from the data supply engine 312 (block 602). When the updated data is received, the example process moves to a determination as to whether the updated data is an update to speed data and heading change data, or the updated data is an actual position (block 604). If the updated data is speed data and heading change data (again block 604), the example process moves to speed & heading change (block 606), where the "location" of the clone process is updated, to arrive at or predict the state of the clone process (block 608). The example process then retreats to the wait for further data.

If the updated data includes an actual position (again block 604), the example process moves to calculating metrics regarding the actual position compared to the respective position of the clone process (block 610), among other possible metrics, such as metrics related to the Extended Kalman Filter process discussed more below. The metrics related to position (block 612) are passed to the decision engine (DE) 402, and the example process waits for a termination decision (block 614). If the decision engine 402 elects to keep the clone process alive (again block 614), the example process returns to waiting for the next set of updated data (again block 602). If the decision engine elects to kill or terminate the clone process (again block 614), the clone process is killed or terminated (block 616), and the process ends.

In some cases a data update may include both speed data, heading change data, and an actual position. In at least some embodiments, when all three data types arrive, the example clone process calculates the updated respective location (block 606), and then calculates the metrics (block 610); however, the flow diagram does not show the simultaneous arrival case so as not to unduly complicate the figure.

In example cases each clone process is an instance of a Kalman Filter, and in certain cases an Extended Kalman Filter. A bit more mathematically then, the state of clone process at time t may be presented by:

$$\hat{x}_{t|t} = \begin{bmatrix} \hat{s}^x_{t|t} \\ \hat{s}^y_{t|t} \\ \hat{\theta}_{t|t} \end{bmatrix} \quad (2)$$

where $\hat{x}_{t|t}$ is updated state estimate of the clone process at time t, where $\hat{s}_{t|t}^x$ is the x-coordinate, $\hat{s}_{t|t}^y$ is the y-coordinate and $\theta_{t|t}$ is the heading. Speed and heading change data are represented by $$u_t = \begin{bmatrix} v_t \\ \Delta\theta_t \\ \tau_t \end{bmatrix} \quad (3)$$

where $v_t$ is the speed at time t, $\Delta\theta_t$ is the heading change at time t, and $\tau_t$ is the time passed after last information reception. Position information at time t is represented by $$z_t = \begin{bmatrix} s_t^x \\ s_t^y \end{bmatrix} \quad (4)$$

where $s_t^x$ is the x-coordinate, and $s_t^y$ the y-coordinate. When indoor $z_t$ is beacon position, and when outdoor $z_t$ is GPS position.

In the Extended Kalman Filter implemented in at least some embodiments, the state transition and observation matrices are defined by the following Jacobians:

$$F_t = \frac{\partial f}{\partial x}\bigg|_{\hat{x}_{t|t-1}, u_t} = \begin{bmatrix} 1 & 0 & -v_t\tau_t\sin(\theta_{t-1|t-1}+\Delta\theta_t) \\ 0 & 1 & v_t\tau_t\cos(\theta_{t-1|t-1}+\Delta\theta_t) \\ 0 & 0 & 1 \end{bmatrix} \text{ and} \quad (5)$$

$$H_t = \frac{\partial h}{\partial x}\bigg|_{\hat{x}_{t|t-1}} = \begin{bmatrix} 1 & 0 & 0 \\ 0 & 1 & 0 \end{bmatrix} \quad (6)$$

where $F_t$ is the state transition model, and $H_t$ is the observation model.

In example cases, when speed and heading change data are received from the data supply engine 312, the state of a clone process is updated using the prediction procedure of the Extended Kalman Filter $$\hat{x}_{t|t-1} = f(\hat{x}_{t-1|t-1}, u_t) \quad (7)$$

$$P_{t|t-1} = F_t P_{t-1|t-1} F_t^T + Q_t \quad (8)$$

where $\hat{x}_{t|t-1}$ is the predicted state estimate across the transition from time t−1 to time t, $P_{t|t-1}$ is the predicted covariance estimate, $Q_t$ is process noise covariance matrix (i.e., the potential error in the speed and heading change data combined with the prediction process), and f is the state prediction function that transitions the clone process state with the given speed and heading change input $u_t$ $$f(\hat{x}_{t-1|t-1}, u_t) = \hat{x}_{t-1|t-1} + \begin{bmatrix} v_t\tau_t\cos(\theta_{t-1|t-1}+\Delta\theta_t) \\ v_t\tau_t\sin(\theta_{t-1|t-1}+\Delta\theta_t) \\ \Delta\theta_t \end{bmatrix}. \quad (9)$$

Actual position information is obtained from lodestar devices in the navigation domain. For example, in an indoor area the position information may be received from BLE beacons or any other transmitter transmitting location information, such as UWB transmitters or any other type. When outdoors, position information may come, for example, from GPS signals and/or cellular tower triangulation. Regardless of the lodestar device used in the navigation domain, in example embodiments the position estimation module 304 calculates and provides the actual position information, and supplies the actual position 320 (FIG. 3) to data supply engine 312 (FIG. 3) for boundary checks and verification. "Internal Position" is then determined by fusing sensor supplied data and map information. Internal Position is inherently and significantly more accurate than externally supplied position information.

The state of a clone process is updated by using and update procedure of Extended Kalman Filter:

$$\tilde{y}_t = z_t - h(\hat{x}_{t|t-1}) \quad (10)$$

$$S_t = H_t P_{t|t-1} H_t^T + R_t \quad (11)$$

$$K_t = P_{t|t-1} H_t^T S_t^{-1} \quad (12)$$

$$\hat{x}_{t|t} = \hat{x}_{t|t-1} + K_t \tilde{y}_t \quad (13)$$

$$P_{t|t} = (1 - K_t H_t) P_{t|t-1} \quad (14)$$

where $\tilde{y}_t$ is the measurement residual, $S_t$ is the residual covariance, $K_t$ is the near-optimal Kalman gain, $\hat{x}_{t|t}$ is updated state estimate, $P_{t|t}$ is the updated covariance estimate, $R_t$ is the measurement noise covariance matrix (i.e., the potential error in the beacon position information) and $h(\hat{x}_{t|t-1})$ is the function that adapts the clone process state vector to the position information vector $z_t$ $$h(\hat{x}_{t|t-1}) = H_t \hat{x}_{t|t-1}. \quad (15)$$

After the state of a clone process is updated upon reception of a position information, state of the clone process is passed to the decision engine (block 402, FIG. 4) for the evaluation of the survival of the clone process in the next time frame. The specification now turns to a description of the decision engine 402 regarding clone process termination decisions as well as determining the heading of mobile device 200 (FIG. 2) from remaining clone processes.

Returning briefly to FIG. 4, the decision engine 402 receives state information from the clone processes (as shown by arrow 404). Using the state information, the decision engine makes decisions, and conveys the decisions back to the clone processes (as shown by arrow 406). The decision engine 402 in example embodiments has two functions: making kill or termination decisions regarding each clone process using the state information; and determining whether the remaining clone processes are converging, and if so calculating a heading from the remaining clone processes. Starting with the kill or termination decisions, and as alluded to above, in example cases the decision engine 402 kills or terminates a clone process if the distance between the clone process and the latest actual position identified position estimation module 304 is greater than a threshold, and in some cases threshold is optimized and pre-determined for a venue. Stated otherwise, the decision engine terminates each clone process whose separation between its respective position and the actual position is greater than the predetermined threshold being a separation threshold. The example decision engine 402 also kills or terminates a clone process if the clone process is getting too close to a wall or any obstacle identified by map data 306. 'Close' is pre-determined for a venue. Stated otherwise, the decision engine 402 kills or terminates each clone process whose gap between its respective position and an obstacle is less than the predetermined threshold being a gap threshold.

Figure 7:
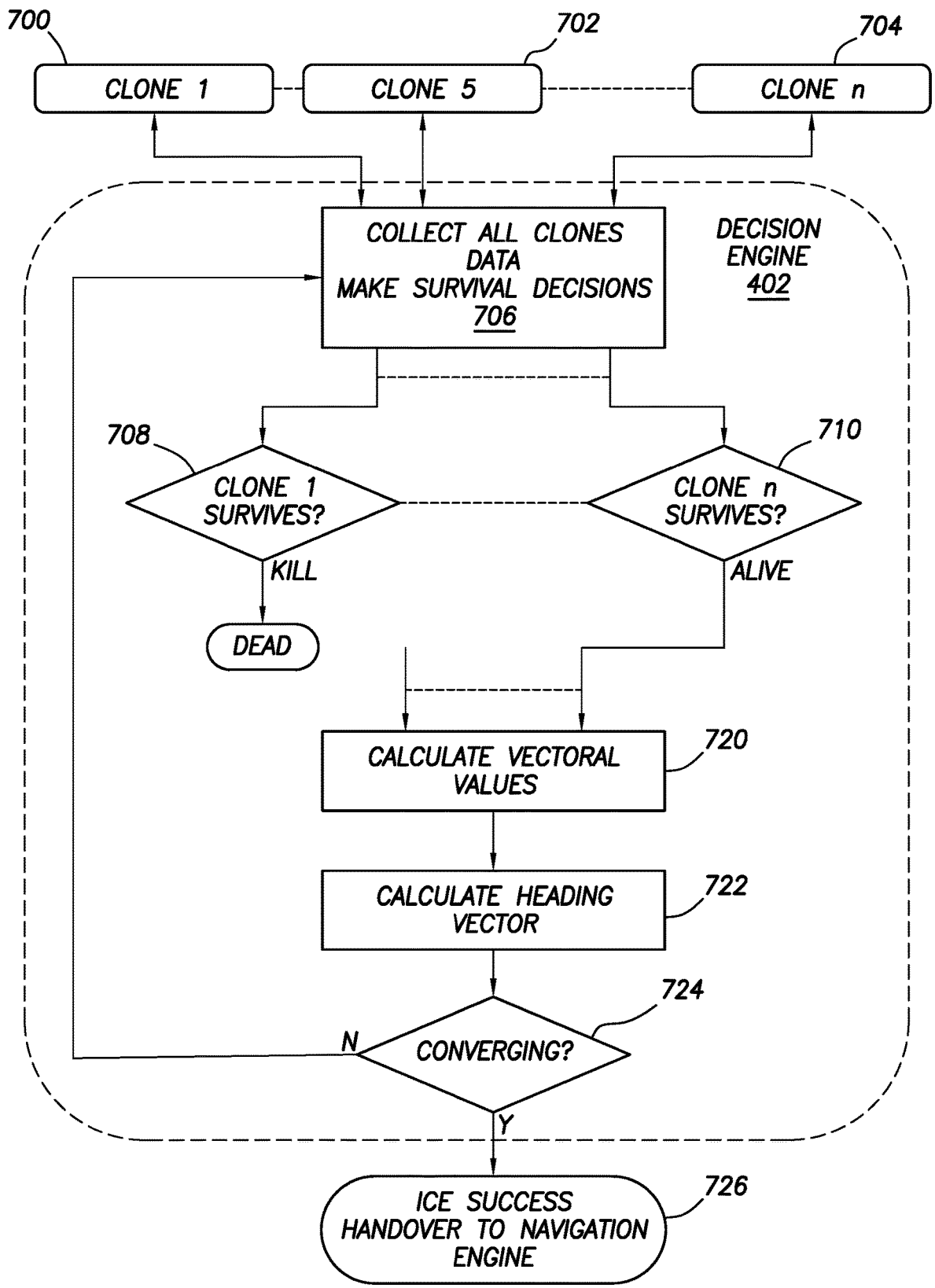
FIG. 7 shows a flow diagram of the process of the decision engine in accordance with at least some embodiments.

FIG. 7 shows a flow diagram of the process of the decision engine in accordance with at least some embodiments. In particular, shown across the top of the figure are a plurality of clone processes 700, 702, and 704. When the clone processes are initially spawned, all the clone processes communicate with the decision engine 402 (see arrow 406 of FIG. 4). As the clone processes are terminated during the determination of initial heading, fewer and fewer remain to communicate with the decision engine 402. The decision engine 402 collects all the state data from the clone processes (block 706), and makes kill or termination decisions using the data (again block 706). For each clone process still "alive", a decision is then made whether to kill or terminate each clone process. FIG. 7 shows two example decision blocks 708 and 710 making kill or termination decisions, but there would be a decision block for each clone process and/or each remaining clone process. With the data of the remaining clone processes, a calculation of vectoral values is made (block 720), followed by a calculation of a heading vector (block 722). From there, a decision is made as to whether the direction suggested by the remaining clones is converging (block 724). If not, the process retreats to the collection of clone data (block 706). If convergence has occurred (again block 724), the initial convergence engine has successfully determined the initial heading, and handover is made to the navigation engine or navigation program (block 726). The specification turns to a visual representation of determining whether convergence on a heading has taken place.

Figure 8:
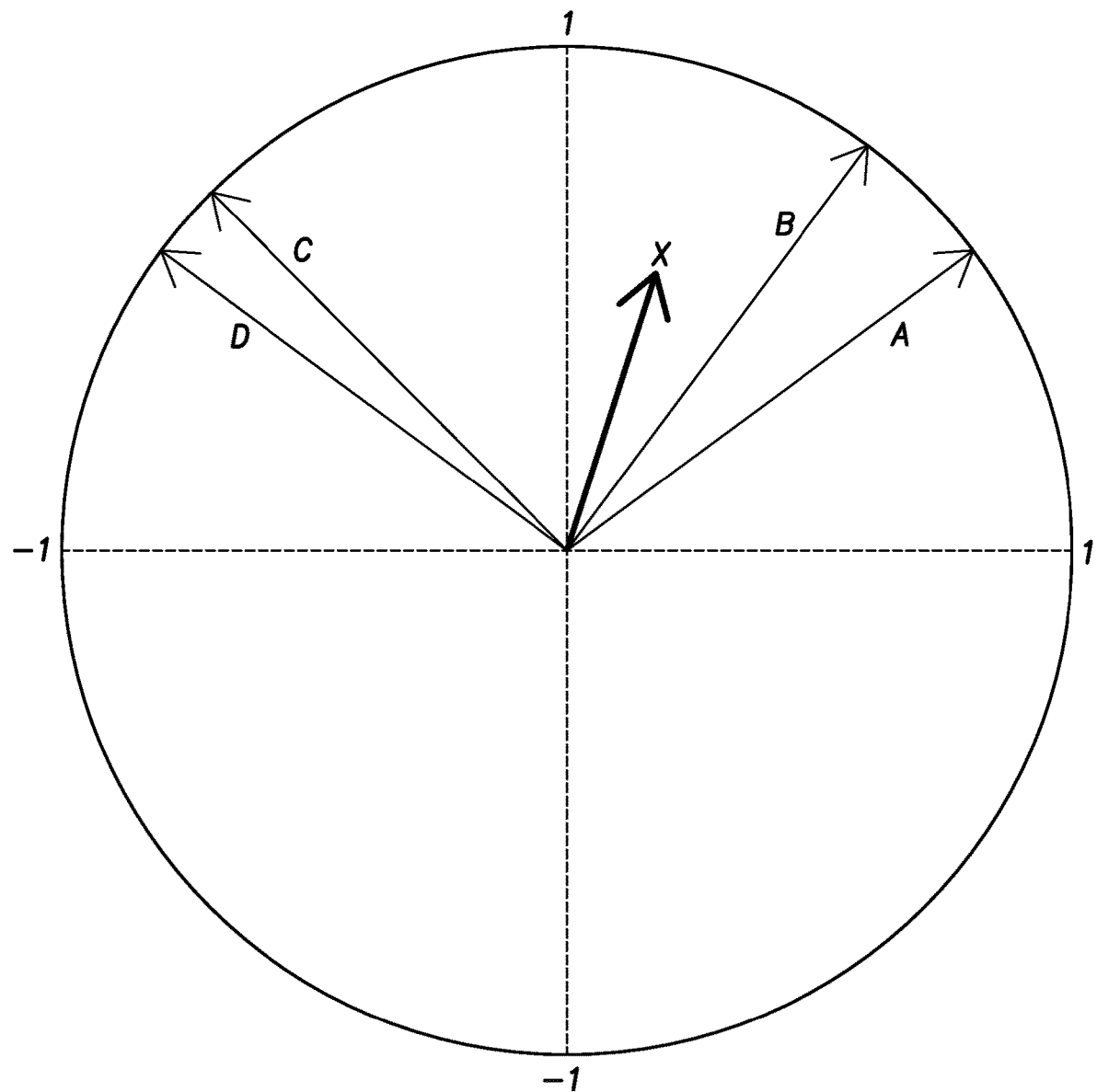
FIG. 8 shows a unit circle in order to describe convergence determinations, in accordance with at least some embodiments.

FIG. 8 shows a unit circle in order to describe convergence determinations, in accordance with at least some embodiments. In particular, FIG. 8 assumes that four clone processes remain, being clone processes A, B, C, and D. Each clone process has a unique heading, which may be either the original unique heading, or headings modified by one or more sets of heading change data. Since all the clone processes are provided the heading change data, the relative relationship between the unique headings remain unchanged. The headings are implied by the arrows indicated each clone process in FIG. 8. Moreover, since all the clone processes are provided the same initial speed, and the same sets of speed data, the vector displacement of each clone process from the initial location will be the same, and thus for purposes of convergence determinations the vectors may be considered to be unit vectors of length one as shown. Calculated displacements from the initial location could also be used.

In accordance with example embodiments, to determine whether convergence has occurred, the decision engine 402 (FIG. 4) calculates an average vector using the unique heading from each of the remaining clone processes. An example average vector is shown in FIG. 8 as vector X. If a magnitude of the average vector X meets or exceeds a magnitude threshold, then the decision engine 402 assumes that convergence has taken place. The heading of the average vector X is then assigned to be the initial heading of the mobile device 200 (FIG. 2) and is provided to the navigation program 300 (FIG. 3). In example cases using unit vector length for the clone processes, the magnitude threshold may be 0.8, but the magnitude threshold may be modified taking into account properties of the venue, such as wall structures and number of beacon devices per square yard.

On the other hand, if the magnitude of the average vector X is below the magnitude threshold, the example process returns to the remaining clone processes calculating new positions based on updated speed data and heading change data, and terminating clone processes, until convergence is achieved.

More mathematically now, for purposes of determining whether convergence has taken place, heading information of surviving or remaining clone processes is used. For each remaining clone process indexed by i (where $1 \leq i \leq n$, and n is the number of remaining clone processes) heading of the average vector is calculated by using its heading $\theta i$ as $\vec{h} = (\cos \theta i, \sin \theta i)$. Then the average heading vector $\vec{h}_{avg} = (x_{avg}, y_{avg})$ is calculated as:

$$x_{avg} = \frac{1}{n}\sum_{i=1}^{n} \cos \theta_i \text{ and} \quad (16)$$

$$y_{avg} = \frac{1}{n}\sum_{i=1}^{n} \sin \theta_i. \quad (17)$$

The magnitude of the average heading vector $m_{avg} = |\vec{h}_{avg}|$ is a number between [0,1] which is calculated as:

$$m_{avg} = \sqrt{x_{avg}^2 + y_{avg}^2} \quad (10)$$

where the variables are as defined above. If $m_{avg}$ is greater than the convergence threshold, the decision engine 402 (FIG. 4) informs initial convergence engine 314 (FIG. 4) about the convergence. If true, the initial convergence engine 314 then calculates estimated position P=(x, y) and heading $\theta = a \tan 2(x_{avg}, y_{avg})$ by using the following formulas:

$$x = \frac{1}{n}\sum_{i=1}^{n} x_i, \quad (19)$$

$$y = \frac{1}{n}\sum_{i=1}^{n} y_i, \text{ and} \quad (20)$$

$$\text{atan2}(x, y) = \begin{cases} \arctan\left(\frac{y}{x}\right) & \text{if } x > 0 \\ \arctan\left(\frac{y}{x}\right) + \pi & \text{if } x > 0 \text{ and } y \geq 0 \\ \arctan\left(\frac{y}{x}\right) - \pi & \text{if } x > 0 \text{ and } y < 0 \\ \frac{\pi}{2} & \text{if } x = 0 \text{ and } y > 0 \\ -\frac{\pi}{2} & \text{if } x = 0 \text{ and } y < 0 \\ \text{undefined} & \text{if } x = 0 \text{ and } y = 0 \end{cases} \quad (21)$$

Thus again, if the magnitude of the average vector X meets or exceeds the magnitude threshold, then the decision engine 402 assumes that convergence has taken place. And if the magnitude of the average vector X is below the magnitude threshold, the example process returns to the remaining clone processes calculating new positions based on updated speed data and heading change data, and terminating clone processes, until convergence is achieved.

If the number of clone processes falls below a certain threshold before convergence is achieved, the initial convergence engine 314 (FIG. 4) starts anew spawns a sufficient number of clone processes. A similar scenario could take place when the user suddenly turns (e.g., a turn 180 degrees) and starts walking in the opposite direction.

In yet more advanced embodiments, the navigation program 300, as part of operating within the indoor venue 102, gathers information about the venue over time and statistically analyzes user behavior. For example, if a hallway is not used very often, then it is less likely that user should turn into that hallway. The example systems and methods can reduce the number of clones spawned that way (e.g., the unused hallway of feature would be considered an obstacle). This feature is innovative and improves on actual map data. It may be that the hallway is dark that is why it is not used often. In cases where the example mobile device does not have internet access (e.g., cellular or WIFI) within the venue, the navigation program 300 may save the data, and transmit to a central server at a later point in time, as again connection to a central server is not needed for the initial heading determinations of the various embodiments.

Figure 9:
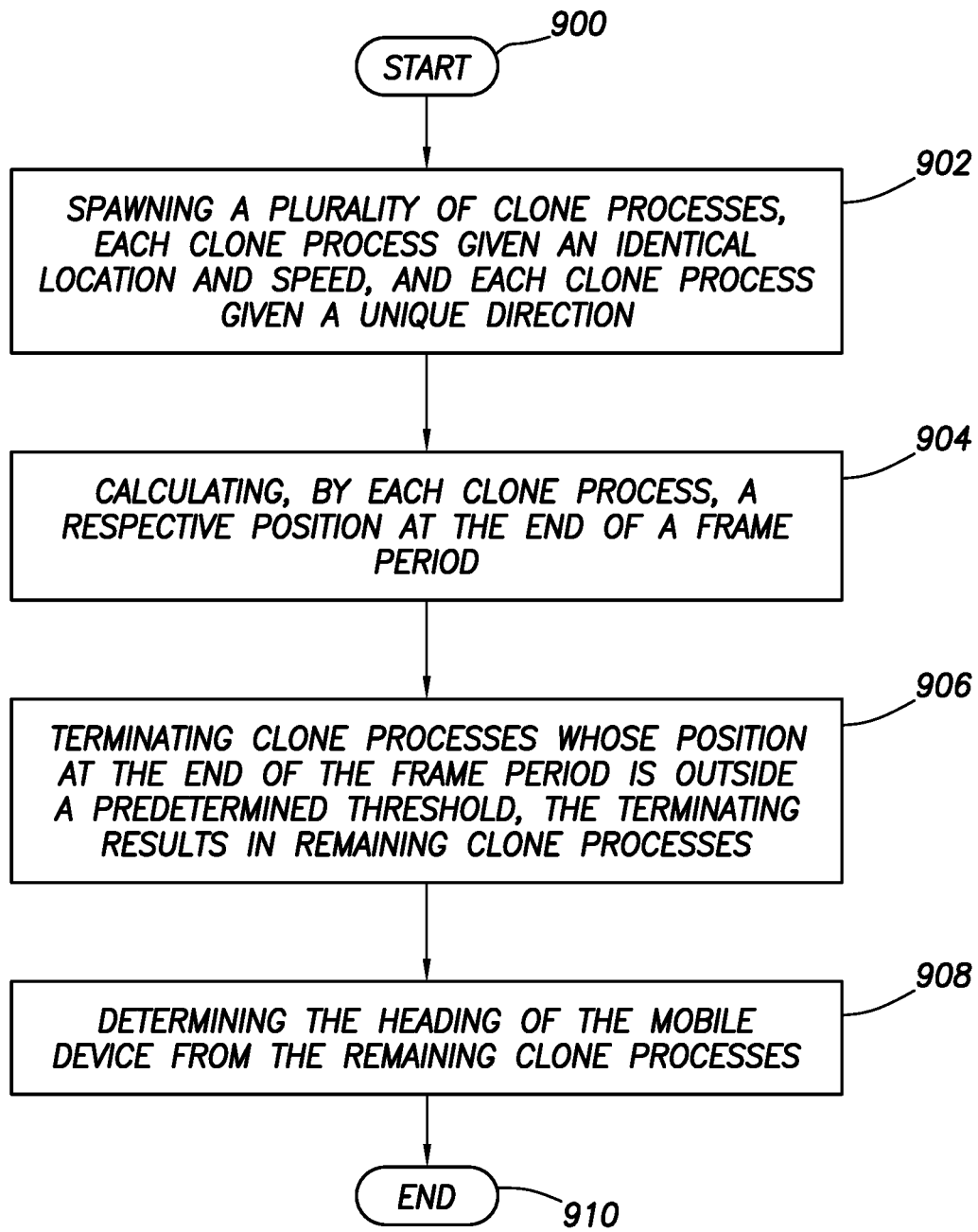
FIG. 9 shows a method in accordance with at least some embodiments.

FIG. 9 shows a method in accordance with at least some embodiments. In particular, the method starts (block 900) and comprises: spawning a plurality of clone processes, each clone process given an identical location and speed, and each clone process given a unique direction (block 902); calculating, by each clone process, a respective position at the end of a frame period (block 904); terminating clone processes whose position at the end of the frame period is outside a predetermined threshold, the terminating results in remaining clone processes (block 906); and determining the heading of the mobile device from the remaining clone processes (block 908). Thereafter the method ends (block 910).

Outdoor Navigation

The prevailing lodestar devices for outdoor navigation are GPS satellites. Other lodestar devices for outdoor navigation are possible, such as cellular towers of a cellular network, where the location may be determined by triangulating and/or RSSI regarding signals from cellular towers. Moreover, it is possible that some outdoor venues may also include beacon devices even though mobile devices within the outdoor venue can receive GPS signals. Nevertheless, outdoor areas may be considered or represent a navigation domain different than an indoor navigation domain.

Referring again to FIG. 1, consider that the user has stepped outdoors through doors 104 of the indoor venue 102 and is standing at an initial outdoor location 118. Further consider that the user would like to navigate to another building within the complex or campus. The mobile device carried by the user has a navigation program (e.g., the same or different than the navigation program used for indoor areas) that either knows in advance, or is provided upon request from the cellular data network, a map of the outdoor layout. While the mobile device may know its initial outdoor location 118, the initial heading may not be known or there may be more than one viable solution based on the accuracy of the location data available at the time. As with indoor navigation, if the navigation program makes an incorrect assumption about direction to travel, the user may travel a significant distance in the wrong direction before being given a correct heading.

Again, related-art systems may take several minutes to determine the initial outdoor heading, in which case the user may be walking in the wrong direction before the outdoor navigation platform can resolve an initial heading. By contrast, example embodiments are directed to systems and methods for estimating initial direction at start-up of navigation, including start-up of outdoor navigation. More particularly, and much like the indoor navigation discussed above, example embodiments are directed to determining an initial heading of the mobile device by not assuming a particular initial heading; rather, example methods spawn a plurality of clone processes that are initially given identical locations and identical speeds, and with each clone process assigned or given a unique direction. The clone processes each calculate a respective position after a frame period. In some cases, each clone process performs multiple location calculations during the frame period by being provided speed heading change information multiple times during the frame period. Eventually the mobile device determines a new position indication (likely with higher accuracy than the first position indication) that too is passed to the clone processes. Each clone process calculates metrics related to the respective position and the actual position, and clone processes whose assigned directions are sufficiently different than the actual direction of travel are terminated, resulting in remaining clone processes. When the remaining clone processes sufficiently agree, an initial heading is thus established. In example embodiments the initial heading is determined in two seconds or less, and in some cases one second or less.

Referring again to FIG. 3. FIG. 3 was initially discussed in terms of indoor navigation. However, the navigation program 300 itself, or a version thereof, may be used for outdoor navigation. The discussion continues based on the assumption that the navigation program 300 operates for both indoor and outdoor navigation. With the benefit of this disclosure one having ordinary skill in the art could create an outdoor navigation program, or modify the navigation program 300 for outdoor navigation. Operation of the example navigation program 300 is largely the same for outdoor navigation as for indoor navigation, and as described above. Thus, so as not to unduly lengthen the discussion the navigation program 300 will not be described again in its entirety here. Rather, the description focuses on a few areas where the navigation program 300 operates differently in the outdoor context, starting with the position estimation module 304.

In the outdoor context, the position estimation module 304 may create position data periodically (e.g., once every second) based on lodestar devices for outdoor navigation. In an example system, the position estimation module 304 may receive position data from the GPS receiver 220 and provide the position data to the initial heading module 302. Because the example GPS-based position calculations inherently contain error information, when providing the example GPS-based position data to the data supply engine 312 the position estimation module 304 likewise provides the error information to be used in the initial heading determination. Depending on location of the mobile device (e.g., near the indoor venue 102), the position estimation module 304 may also receive data from a lodestar device in other navigation domains, and thus the position estimation module 304 may discard or ignore signals and/or data from lodestar devices in different navigation domains. For example, if the user is at location 118 (FIG. 1), the mobile device may receive GPS-signals and calculate position based on those GPS signals, but the mobile device may also receive signals from beacons within the indoor venue 102. Thus, the position estimation module 304 may, knowing its position outside the indoor venue 102, discard or ignore the beacons associated with the indoor venue.

In addition to, or in place of, the GPS-based position data, in some cases the position in outdoor areas may be determined (with varying degrees of accuracy) based on "triangulation" of three or more cell towers having known location. Thus, the cell-tower based position data may be used in place of, or supplement, GPS-based position data. Inasmuch as the cell-tower based position data may be calculated by the processor 204 (FIG. 2), no physical device is shown in FIG. 3 to provide the cell-tower based position data to the position estimation module 304. Instead, such cell-tower based position data may be transferred between software processes by way of inter-process communication (IPC).

Still considering the differences in operation of navigation program 300 as between the example indoor navigation and outdoor navigation, the map data 306 received by the initial convergence engine 314 is map data for the outdoor area or outdoor venue, such as map data downloaded through the cellular communication system 218 (FIG. 2) or read through the short-range wireless communication system 216. Depending on the proximity of the mobile device and the user to the example indoor venue 102, the display device of the mobile device may show a merged map concatenating a map (or portion thereof) of the indoor venue 102 with a map (or portion thereof) of the outdoor area. The map concatenation aspects are discussed more below in the section regarding transitioning between navigation domains.

In the outdoor navigation context, the initial convergence engine 314 is used to determine heading much like the indoor navigation context. The initial convergence engine 314 receives the speed data, heading change data, and when available updates to the actual position. Moreover, the initial convergence engine 314 receives the map data 306. The initial convergence engine spawns a plurality of clone processes, and terminates clone processes whose unique direction fails to sufficiently match the actual direction, all as previously discussed. The data used to create the clone processes is data based on and collected in the outdoor area, but the underlying mathematics (e.g., Kalman Filter, or Extended Kalman Filter) are the same. In implementing the Kalman or Extended Kalman Filters, the expected position error, and thus the expected error in speed and heading change, are modified to take into account the difference in lodestar devices. More particularly, in Equation 8 above the $Q_t$ value, being the process noise covariance matrix (i.e., the potential error in the speed and heading change data combined with the prediction process), is modified to account for the potential error in the speed and heading change data. Similarly, in Equation 11 above the $R_t$ value, being the measurement noise covariance matrix (i.e., the potential error in the lodestar position information), is modified to account errors associated with GPS-based position determinations. The errors are in some cases larger than their indoor venue counterparts, and may be based on parameters such as the number of satellites used to make the position determination, and signal strength from those satellites.

Transitioning Between Navigation Domains

The specification now turns to considerations surrounding transitioning between navigation domains, such as transitioning from an indoor area or indoor venue to an outdoor area, or transitioning from an outdoor area to an indoor area. Example embodiments may thus comprise determining (e.g., by a processor of a mobile device) that the mobile device and thus the user is approaching a portal between a first navigation domain and a second navigation domain. When approaching the portal, the example method may comprise displaying (e.g., on a display device of the mobile device) a merged map concatenating a map of the first navigation domain with a map of the second navigation domain. Prior to the mobile device transiting through the portal, the example method may comprise showing location of the mobile device on the map of the first navigation domain. And then the example embodiment may comprise showing location of the mobile device on the map of the second navigation domain after the mobile device transitions through the portal into the second navigation domain.

Figure 10:
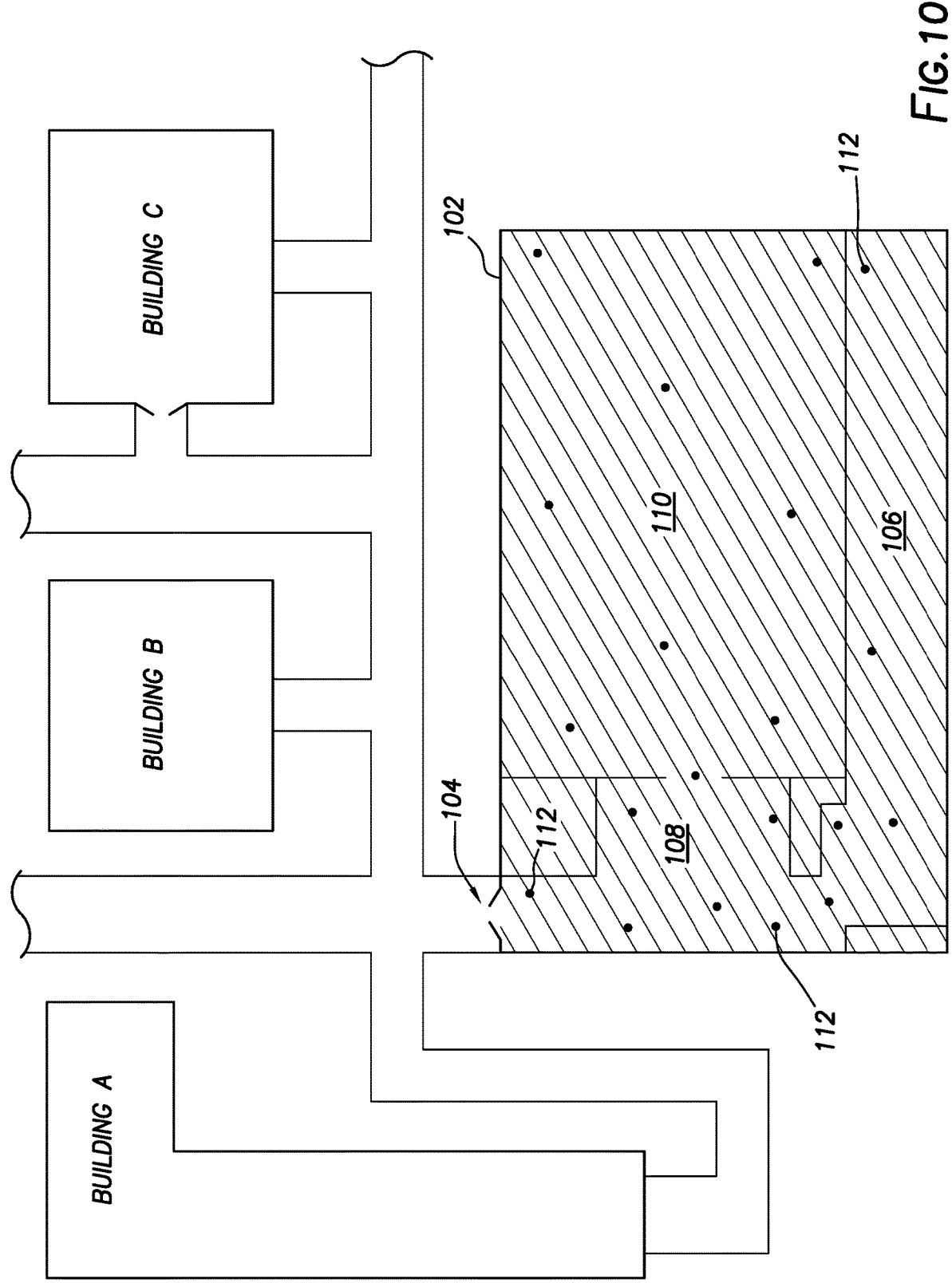
FIG. 10 shows an overhead view of a building complex in accordance with at least some embodiments.

FIG. 10 shows an overhead view of a building complex in accordance with at least some embodiments. In particular, FIG. 10 shows an example of a merged map concatenating a map of the first navigation domain with a map of the second navigation domain. More particularly still, FIG. 10 shows an example merged map concatenating a map of the indoor venue 102 with a map of the outdoor area outside the indoor venue 102. In the example situation, when the processor of mobile device determines that the mobile device is approaching a portal (e.g. doors 104) between the example indoor venue 102 and the outdoor area, and mobile device may create the merged map and show the merged map (FIG. 10) on the display device of the mobile device. As the user, and thus mobile device, transitions between the indoor venue 102 and the outdoor area, the user's location may be shown on the merged map both before and after the transition. In accordance with example embodiments, the merged map delineates or differentiates the different navigation domains with a visual cue. For example, and as shown in FIG. 10, the example systems and methods may provide shading with respect to the indoor venues so that the user can quickly and intuitively distinguish on the merged map the example indoor venue 102 from the outdoor area. Shading is but one example of a visual cue to distinguish the maps of the individual navigation domains on the display device. Other visual cues may include, but are not limited to, showing the map of a first navigation domain in a different color than the second navigation domain, outlining the map of the first navigation domain with a box (e.g., colored box), outlining each map with a box having a different color, having the map of the first navigation domain blinking, or having the map of the first navigation domain fading out with increasing distance from the first navigation domain.

With regard to merged map, note that the zoom level affects how much of each map may be visible. At high zoom levels, only a portion of the map of the first navigation domain, and only a portion of the map of the second navigation domain, may be visible on the display device. For example, at high zoom levels only a single tile (e.g., pixel image having 256×256 pixels) of the first navigation domain may be concatenated with a single tile of the second navigation domain. Nevertheless, displaying only a portion of the map of an overall navigation domain shall still be considered to be displaying a map of the navigation domain.

Figure 11:
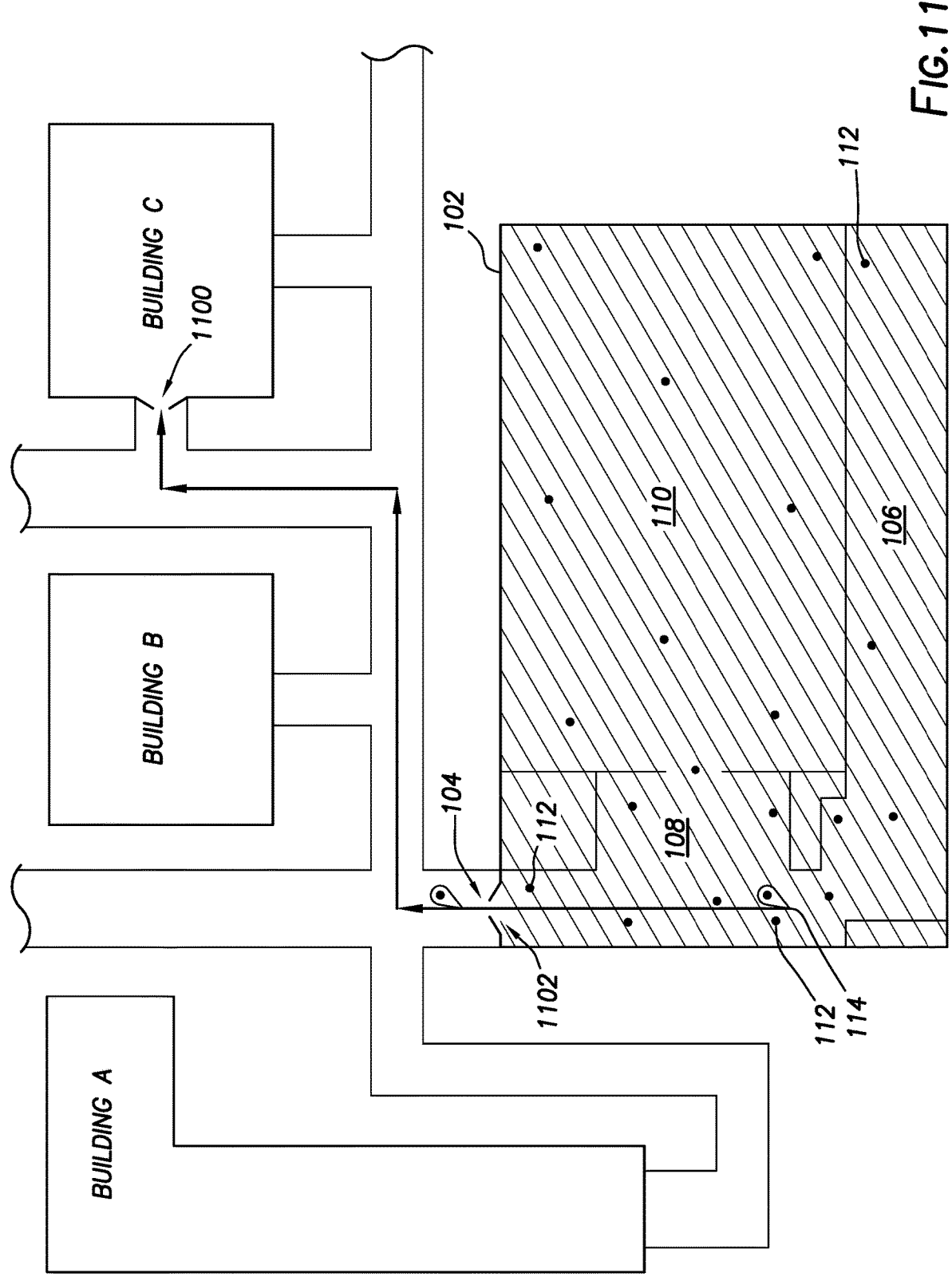
FIG. 11 shows an overhead view of a building complex in accordance with at least some embodiments.

The description of various aspects of transitioning between navigation domains will be explained in reference to example navigation from the indoor venue 102 to another building in the complex, and thus a navigation through the outdoor area. To that end, FIG. 11 shows the merged map of FIG. 10, but also includes a path of travel from location 114 within the indoor venue 102 to Building C within the example campus or complex. In particular, consider that a user and mobile device are at location 114 within the indoor venue 102, and that the user desires to navigate to the entry portal shown by doors 1100 of Building C.

In accordance with example embodiments, a determination is made that the mobile device is approaching the doors 104. Making the determination regarding approaching the doors 104 may take many forms. In some cases, the mobile device makes the determination based on correlating position within the indoor venue 102 to map data of the indoor venue 102. For example, the mobile device may receive signals from beacon devices 112 and make a position calculation based on those signals (e.g., triangulation, RSSI). Using the position calculation and map data for the indoor venue 102, the mobile device determines that it is within a predetermined distance (e.g., within ten meters, within five meters, or within three meters) of the doors 104. Thus, a determination that the mobile device is approaching the portal may be a determination that the mobile device is within a predetermined distance of the portal.

In yet still other cases, the determination regarding approaching the doors 104 may have a heading aspect as well. That is, the mobile device may receive signals from beacon devices 112 and make a series of position calculations based on those signals (e.g., triangulation, RSSI). Based on the series of position calculations the mobile device may determine a heading for the direction of travel. Determining the heading may involve use of the clone processes as discussed above. Using the series of position calculations, the heading, and map data for the indoor venue 102, the mobile device determines that it is within a predetermined distance (e.g., within five meters, or within three meters) of the doors 104 and heading toward the doors. Thus, a determination that the mobile device is approaching the portal may be a determination that the mobile device is within a predetermined distance of the portal and has a heading that is toward the portal.

In yet still other cases, portals or exits may be directly identified by beacon devices associated with the exits. For example, beacon device 1102 in FIG. 11 may be located near the doors 104. The example beacon device 1102 may be placed in the ceiling above the doors, placed on the door frames of the doors, or placed on the wall a predetermined distance from the doors. The beacon device 1102 may transmit location data that indicates that the beacon device 1102 identifies the doors 104. In these embodiment then, the mobile device determines that it is approaching the doors 104 based the location data received from the beacon device 1102 associated with the doors 104. In yet still other cases, the mobile device may combine determinations, and analyze both location data from a beacon device associated with the doors, locations determined from other beacon devices within indoor venue, and heading information.

In some cases, proximity to a portal may be sufficient to trigger creation and display of the merged map. However, a user and the associated mobile device may get close to or pass a portal with no intention of exiting the portal. Thus, in yet still other embodiments the mobile device gauges the decisiveness of the user as part of the determination regarding approaching a portal. In particular, in example embodiments the mobile device calculates speed and heading within the navigation domain based signals from lodestar device(s) associated with the navigation domain. In these embodiments, determining that the mobile device is approaching the portal may further comprise finding that the heading of the mobile device is within a predetermined range of headings and the speed is above a predetermined threshold. The predetermined range of headings may be a range of headings having a center heading that is directly toward the portal from a current location of the mobile device. In the example situation of FIG. 11 then, the mobile device may determine it is approaching the doors 104 for purposes of exiting the indoor venue when the heading of the mobile device is within a predetermined range of headings and the speed is above a predetermined threshold the user is walking toward the doors 104 at a speed above the predetermined threshold (e.g., above 1.4 meters per second (m/s), or above 2.0 m/s).

Still referring to FIG. 11, now consider that the user and the mobile device exit the indoor venue 102 and are at location 118 in the outdoor area. In the transition from the indoor venue 102 to the outdoor area, the lodestar devices used for position determination change. The mobile device may thus need to calculate again position, speed, and heading using the lodestar device in the new navigation domain. In the example outdoor area, the mobile device may make position determinations using GPS-based position data. The mobile device may determine heading by spawning clone processes as discussed above. In some cases, the heading determination by spawning clone processes may take into account heading within the prior navigation domain. Thus the assigned directions for the clone processes may be less than all directions, and instead may limited to a range of headings selected based heading in the prior navigation domain (similar to a heading determination when a user makes a turn). Regardless, using the lodestar devices associated with the outdoor area, the mobile device may then navigate the user along the sidewalk to doors 1100 of Building C. When the mobile device approaches the doors 1100, the mobile device may create and display a merged map showing the map of the outdoor area and a map of the indoor area associated with Building C. The determinations regarding approaching doors 1100 of Building C are the same as those discussed above regarding approaching doors 1104.

Figure 12:
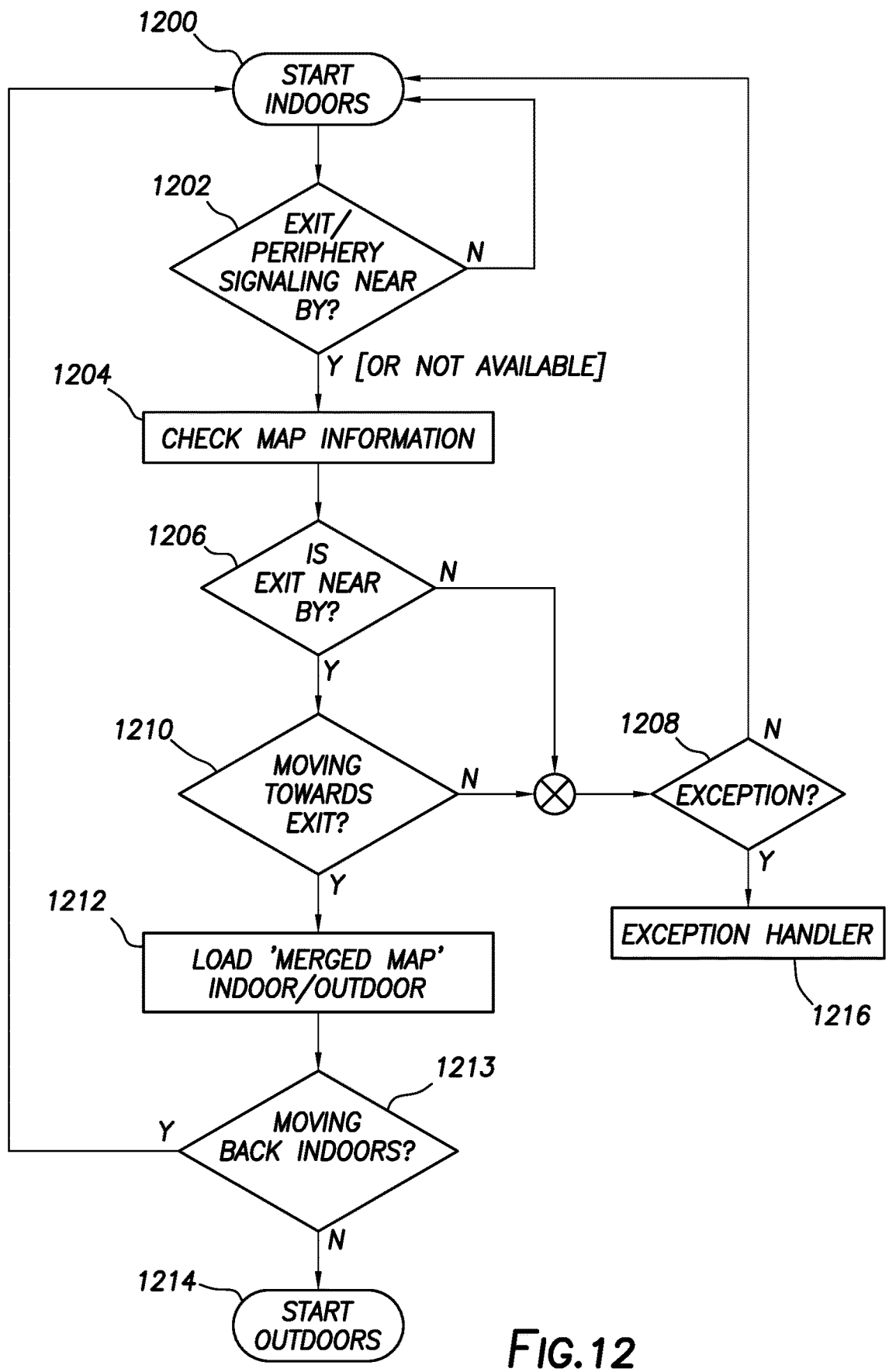
FIG. 12 shows a flow diagram of a method in accordance with at least some embodiments.

FIG. 12 shows a flow diagram of a method in accordance with at least some embodiments. In particular, FIG. 12 show a flow diagram that may be implemented in software executed by the processor 204 (FIG. 2) of the mobile device 200 (FIG. 2). The example method starts (block 1200) assuming the navigation domain is an indoor venue. The example method proceeds to a determination of whether the mobile device is receiving location data from a lodestar device that directly identifies a portal (block 1202). That is, in navigation domains that have lodestar device that transmit location data that directly identifies portals, the decision block 1202 determines whether a portal is nearby. If no portal is nearby, the example method retreats to the start (block 1200). If the mobile device is near a portal, or if the venue does not support lodestar devices that transmit location data identifying portals, then the example method proceeds to checking map information (block 1204). That is, using one or more positions calculated from lodestar devices in the navigation domain, the processor of the mobile device makes a determination of the proximity of the mobile device to portals using the map data (block 1206 "Exit nearby?"). If no exit is nearby (again block 1206), the example method checks for exceptions (block 1208), and if no exceptions are present the example method retreats to the start (block 1200). Exceptions are discussed in detail below.

Returning to the determination of proximity of the mobile device to portals using the map data (block 1206 "Exit nearby?"). In some example systems, proximity of the mobile device to the exit is sufficient to proceed to the creating and displaying the merged map; however, in the example flow diagram of FIG. 12, if an exit is nearby (yes path out of block 1206), the mobile device makes an additional determination regarding whether the mobile device has as heading vector pointed toward the exit (block 1210, "Moving toward the exit?"). In yet still further cases, the decision block 1210 may also include a decisiveness factor (e.g., is speed greater than 1.4 m/s, or is the speed greater than 2.0 m/s). If the mobile device is not moving toward the exit (again block 1210), then the example method checks for exceptions (block 1208). If no exceptions are present, the example method retreats to the start (block 1200).

On the other hand, if the mobile device is moving toward the exit (again block 1210), the example method proceeds to creating and displaying a merged map of the two navigation domains (block 1212, "Load 'Merged' Map Indoor/Outdoor"). If the mobile device moves back indoors (block 1213), the method retreats to the start (block 1200), otherwise the method proceeds to the start for the next navigation domain (block 1214, "Start Outdoors").

Figure 13:
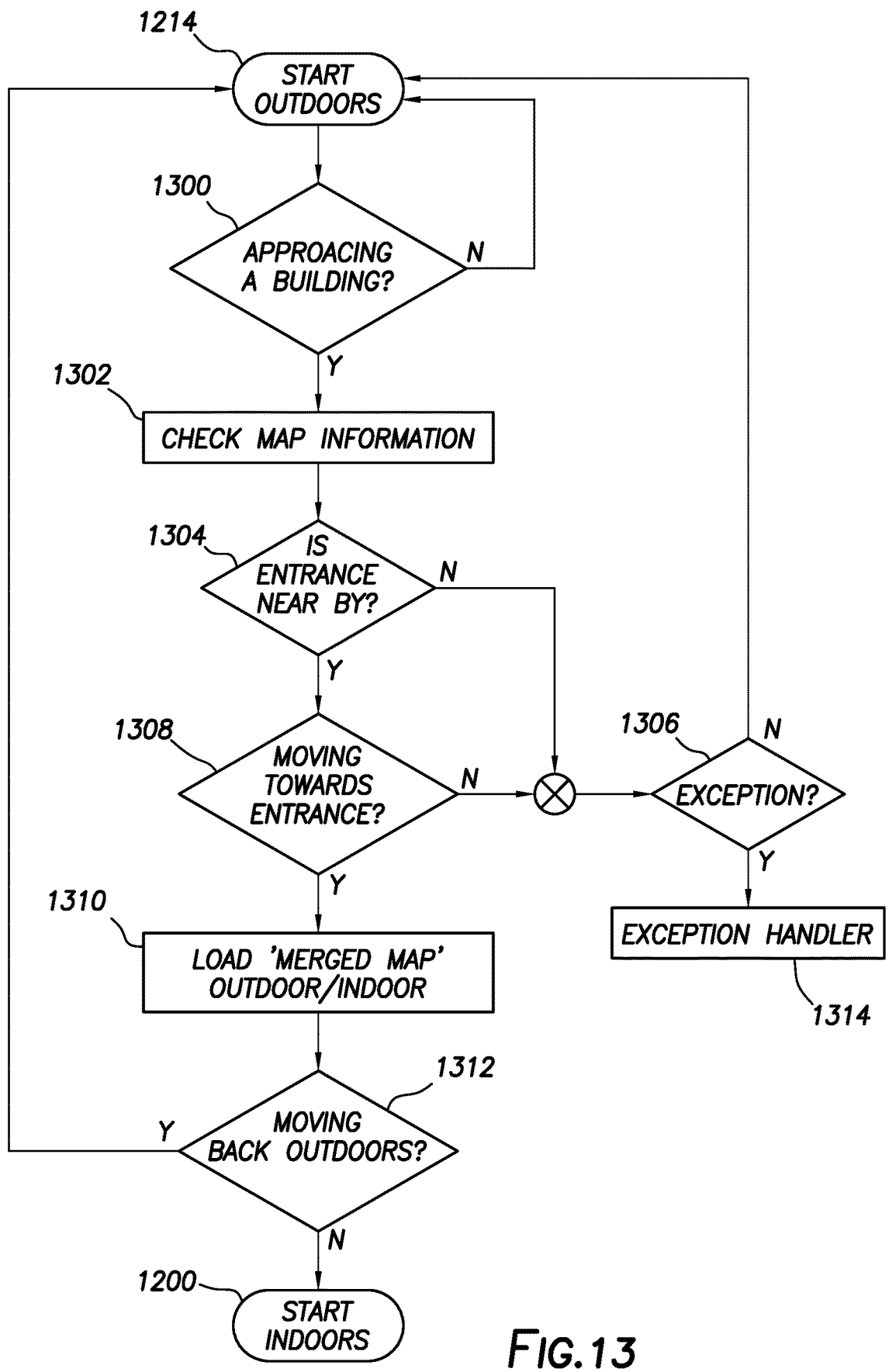
FIG. 13 shows a flow diagram of a method in accordance with at least some embodiments.

FIG. 13 shows a flow diagram of a method in accordance with at least some embodiments. In particular, FIG. 13 show a flow diagram that may be implemented in software executed by the processor 204 (FIG. 2) of the mobile device 200 (FIG. 2). The example method starts (block 1214) assuming the navigation domain is an outdoor area. The example method proceeds to a determination of whether the mobile device is approaching a building (block 1300). If no building nearby, the example method retreats to the start (block 1214). If the mobile device is approaching a building, then the example method proceeds to checking map information (block 1302). That is, using one or more positions calculated from lodestar devices in the navigation domain, the processor of the mobile device makes a determination of proximity of the mobile device to portals using the map data (block 1304, "Is entrance nearby?"). If no entry is nearby (again block 1304), the example method checks for exceptions (block 1306), and if no exceptions are present the example method retreats to the start (block 1214). Exceptions are discussed in detail below.

Returning to the determination of proximity of the mobile device to portals using the map data (block 1304, "Is entrance nearby?"). In some example systems, proximity of the mobile device to the exit is sufficient to proceed to the creating and displaying the merged map; however, in the example flow diagram of FIG. 13, if an entry is nearby (yes path out of block 1304), the mobile device makes an additional determination regarding whether the mobile device has as heading vector pointed toward the exit (block 1308, "Moving toward entrance?"). In yet still further cases, the decision block 1308 may also include a decisiveness factor (e.g., is speed greater than 1.4 m/s, or is the speed greater than 2.0 m/s). If the mobile device is not moving toward the entrance (again block 1308), then the example method checks for exceptions (block 1306). If no exceptions are present, the example method retreats to the start (block 1214).

On the other hand, if the mobile device is moving toward the entrance (again block 1308), the example method proceeds to creating and displaying a merged map of the two navigation domains (block 1310, "Load 'Merged' Map Outdoor/Indoor"). If the mobile device moves back outdoors (block 1312), the method retreats to the start (block 1214), otherwise the method proceeds to the start for the next navigation domain (block 1200, "Start Indoors").

Each of FIGS. 12 and 13 include a determination of whether exceptions are present (block 1208 in FIG. 12, and block 1306 in FIG. 13), and if so the example method proceeds to an exception handler (block 1216 in FIG. 12, and block 1314 in FIG. 13). The specification now turns to a description of the exception handler.

The description to this point has largely assumed that signals and/or location data sent by lodestar devices in each navigation domain are not receivable in other navigation domains. However, in some cases the assumption is not true. For example, the assumption may not be true in buildings with glass domes over large central common areas, building with rooftop terraces, and/or buildings with balconies on multiple floors. In each of these situations, though a mobile device may be within the indoor venue, lodestar devices associated with the outdoor area (e.g., GPS signals, multiple cell tower signals) may be still be received by the mobile device. Navigation domains in which location signals from another navigation domain can be received are referred to as mixed-signal domains. Attempting to navigate in the indoor venue using lodestar devices from the outdoor area may be hazardous.

The issues associated with mixed-signal domains may be addressed, in some cases, by programming the lodestar devices associated with the navigation domain to broadcast exception data. The exception data indicates that the navigation domain, or portions of the navigation domain, are a mixed-signal domain. Using the exception data, the mobile device (e.g., the position estimation module 304) may discard or ignore location signals and/or location data from lodestar devices in the overarching domain. For example, in the case of the glass dome over the large central common area, beacon devices may be placed within the large central common area (e.g., on structural supports for the glass dome, or around the periphery of the large central common area). Those beacons may transmit exception data, and the mobile device within the large central common area may discard or ignore GPS-signals based on the exception data. In the case of roof-top terraces, beacon devices may be placed along and within the terrace. Those beacons may transmit exception data, and the mobile device on the roof-top terrace may discard or ignore GPS-signals based on the exception data. In the case balconies, beacon devices may be placed along and/or within each balcony. Those beacons may transmit exception data, and the mobile device on the balcony may discard or ignore GPS-signals based on the exception data.

In other cases, the issues associated with mixed-signal domains may be addressed by including information in the map data that indicates that the navigation domain, or portions of the navigation domain, are a mixed-signal domain. In the example case of an indoor venue as a mixed signal domain, the mobile device may determine its location using signals received from beacons (the signal not including exception data in this example). By analyzing the map data based on the location, the mobile device (e.g., the position estimation module 304) may discard or ignore location signals and/or location data from lodestar devices in the overarching domain. For example, in the case of the glass dome over the large central common area, using beacon devices within the large central common area the mobile device may determine its location within the large central common area. Based on the location and the map data, the mobile device may know to discard or ignore GPS-signals. The example roof-top terrace situation, and balcony situation, work similarly.

In some cases it may not be possible or feasible to install beacon devices in the mixed-signal domain. For example, the large central common area beneath a glass dome may be too large for beacon coverage, or a roof-top terrace may be too large for beacon coverage. In these situations the mobile device may cease navigation features. That is, while it may be possible to navigate within the example roof-top terrace using GPS-based location data, such navigation may be hazardous (e.g., navigation accuracy may not allow sufficient clearing around the edges of the root-top terrace). Determining that the portion of a navigation area is a mixed-signal area in these cases may take any suitable form. For example, if the mobile device is receiving GPS-based position data, yet that GPS-based position data indicates that the mobile device is within the foot print of an indoor venue (e.g., by analyzing map data regarding the outdoor area), then the mobile device may cease providing navigation information unless and until signals and/or location data received from beacon devices associated with the indoor venue.

A few final thoughts to consider. The example methods and mobile device implementing the example methods need not have network access to operate (particularly if the map data is provided by a beacon device within the venue). Relatedly, the example methods and mobile device implementing the example methods need not be in communication with a central server system or otherwise to make the initial heading determination. In the most basic case, the systems and methods need only receive location information from lodestar devices associated with the navigation domain (e.g., beacon devices or GPS satellite signals).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method of transitioning from a first navigation domain to a second navigation domain, the method comprising:
    calculating, by a processor of a mobile device, speed and heading of the mobile device within the first navigation domain based on signals from at least one lodestar device associated with the first navigation domain, wherein calculating the speed and the heading further comprises:
        spawning a plurality of clone processes, each clone process given an identical location and speed, and each clone process given a unique direction;
        calculating, by each clone process, a respective position at the end of a frame period;
        terminating clone processes whose position at the end of the frame period is outside a predetermined threshold, the terminating results in remaining clone processes; and
        determining the heading of the mobile device from the remaining clone processes;
    determining, by the processor of the mobile device, that the mobile device is approaching a portal between the first navigation domain and the second navigation domain, wherein determining that the mobile device is approaching the portal further comprises finding that the heading is toward the portal and the speed is above a predetermined speed threshold;
    displaying, on a display device of the mobile device, a merged map concatenating a map of the first navigation domain with a map of the second navigation domain;
    showing location of the mobile device on the map of the first navigation domain prior to the mobile device transiting through the portal; and then
    showing location of the mobile device on the map of the second navigation domain.

2. The computer-implemented method of claim 1 wherein the first navigation domain is indoor and the second navigation domain is outdoor.

3. The computer-implemented method of claim 1 wherein displaying the merged map further comprises shading the map of the first navigation domain to distinguish the map of the first navigation domain from the map of the second navigation domain.

4. The computer-implemented method of claim 1 wherein determining that the mobile device is approaching the portal further comprises:
    receiving, by the mobile device, first location data from a lodestar device associated with the first navigation domain; and
    determining from the first location data that the mobile device is approaching the portal from the first navigation domain into the second navigation domain.

5. The computer-implemented method of claim 4:
    wherein receiving the first location data further comprises receiving the first location data from the lodestar device in the form of a beacon, the first location data indicating location of the portal; and
    wherein determining that the mobile device is approaching the portal further comprises utilizing the first location data from the beacon.

6. The computer-implemented method of claim 1 wherein showing location of the mobile device on the map of the second navigation domain further comprises:
    receiving, by the mobile device, signals from lodestar devices associated with the second navigation domain; and
    calculating location of the mobile device within the second navigation domain based on the signals.

7. The computer-implemented method of claim 6:
    wherein receiving signals from the lodestar devices associated with the second navigation domain further comprises receiving signals from the lodestar devices being Global Positioning Systems (GPS) satellites; and
    wherein calculating location of the mobile device within the second navigation domain further comprises calculating based on the signals from the GPS satellites.

8. The computer-implemented method of claim 1 wherein determining that the mobile device is approaching an exit further comprises:
    receiving, by the mobile device, signals from lodestar devices associated with the first navigation domain; and
    determining that the mobile device is approaching the portal from the signals from the lodestar devices associated with the first navigation domain.

9. The computer-implemented method of claim 8:
    receiving signals from the lodestar devices associated with the first navigation domain further comprises receiving the signals from the lodestar devices in the form of beacons; and
    wherein determining that the mobile device is approaching the portal further comprises utilizing the signals from the beacons.

10. A hand-held computing device comprising:
    a processor;
    a memory coupled to the processor;
    a display device electrically coupled to the processor;
    a wireless communication system electrically coupled to the processor, the wireless communication system configured to receive location information wirelessly from lodestar devices external to the hand-held computing device;
    a global positioning system (GPS) receiver coupled to the processor, the GPS receiver configured to receive signals from GPS satellites and determine location of the hand-held computing device;
    the memory stores a program that, when executed by the processor, causes the processor to:
        calculate speed and heading of the hand-held computing device within a first indoor area based on signals from at least one beacon disposed within the first indoor area, the calculation by causing the processor to:
            spawn a plurality of clone processes, each clone process given an identical location and speed, and each clone process given a unique direction;

calculate, by each clone process, a respective position at the end of a frame period;
terminate clone processes whose position at the end of the frame period is outside a predetermined threshold, the terminating results in remaining clone processes; and
determine the heading of the hand-held computing device from the remaining clone processes;
determine that the hand-held computing device is approaching a first portal between the first indoor area and a first outdoor area, the determination based on signals received by the wireless communication system, the determination by causing the processor to ascertain that the hand-held computing device is moving toward the first portal and the speed of the hand-held computing device is above a predetermined speed threshold;
display on the display device a first merged map concatenating a map of the first indoor area with a map of the first outdoor area;
show location of the hand-held computing device on the map of the first indoor area prior to the hand-held computing device transiting through the first portal; and then
show the location of the hand-held computing device on the map of the first outdoor area.

11. The hand-held computing device of claim 10 wherein when the program shows the first merged map, the program further causes the processor to shade the map of the first indoor area.

12. The hand-held computing device of claim 10 wherein the program further causes the processor to:
determine that the hand-held computing device is approaching a second portal between a second outdoor area and a second indoor area, the determination based on signals received by the GPS receiver;
display on the display device a second merged map concatenating a map of the second outdoor area with a map of the second indoor area;
show location of the hand-held computing device on the map of the second outdoor area prior to the hand-held computing device transiting through the second portal; and then
show location of the hand-held computing device on the map of the second indoor area.

13. The hand-held computing device of claim 10 wherein when the program determines that the hand-held computing device is approaching the first portal, the program further causes the processor to:
receive first location data from a beacon disposed with the first indoor area; and
determine from the first location data that the hand-held computing device is approaching the first portal.

14. The hand-held computing device of claim 10 wherein when the program shows location of the hand-held computing device on the map of the first outdoor area, the program further causes the processor to:
receive signals from GPS satellites by way of the GPS receiver; and
calculate location of the hand-held computing device within the first outdoor area.

15. The hand-held computing device of claim 10 wherein when the program determines that the hand-held computing device is approaching the first portal, the program further causes the processor to:
receive signals from beacons disposed within the first indoor area; and
determine that the hand-held computing device is approaching the first portal from the signals from the beacons.

16. The hand-held computing device of claim 10 wherein the program further causes the processor to:
receive first data associated with first beacon devices associated with the first indoor area;
receive second data associated with GPS signals associated with the first outdoor area; and
deduce that the hand-held computing device resides within the first indoor area.

17. The hand-held computing device of claim 16 wherein when the processor deduces that the hand-held computing device resides within the first indoor area, the program causes the processor to:
download map data associated with the first indoor area;
calculate a location relative to at least one of the beacon devices; and
analyze the location in reference to the map data to deduce that the hand-held computing device is within the first indoor area.

18. A hand-held computing device comprising:
a processor;
a memory coupled to the processor;
a display device electrically coupled to the processor;
a wireless communication system electrically coupled to the processor, the wireless communication system configured to receive location information wirelessly from lodestar devices external to the hand-held computing device;
a global positioning system (GPS) receiver coupled to the processor, the GPS receiver configured to receive signals from GPS satellites and determine location of the hand-held computing device;
the memory stores a program that, when executed by the processor, causes the processor to:
receive first data associated with first beacon devices associated with a first indoor area;
receive second data associated with GPS signals associated with a first outdoor area;
deduce that the hand-held computing device resides within the first indoor area, the deduction by causing the processor to deduce based on exception data within the first data;
causing the processor to deduce based on exception data within the first data;
determine that the hand-held computing device is approaching a first portal between the first indoor area and the first outdoor area, the determination based on signals received by the wireless communication system;
display on the display device a first merged map concatenating a map of the first indoor area with a map of the first outdoor area;
show location of the hand-held computing device on the map of the first indoor area prior to the hand-held computing device transiting through the first portal; and then
show location of the hand-held computing device on the map of the first outdoor area.

19. A hand-held computing device comprising:
a processor;
a memory coupled to the processor;
a display device electrically coupled to the processor;
a wireless communication system electrically coupled to the processor, the wireless communication system configured to receive location information wirelessly from lodestar devices external to the hand-held computing device;

a global positioning system (GPS) receiver coupled to the processor, the GPS receiver configured to receive signals from GPS satellites and determine location of the hand-held computing device;

the memory stores a program that, when executed by the processor, causes the processor to:
- receive first data associated with first beacon devices associated with a first indoor area;
- receive second data associated with GPS signals associated with a first outdoor area;
- deduce that the hand-held computing device resides within the first indoor area;
- determine that the hand-held computing device is approaching a first portal between the first indoor area and the first outdoor area, the determination based on signals received by the wireless communication system;
- display on the display device a first merged map concatenating a map of the first indoor area with a map of the first outdoor area;
- show location of the hand-held computing device on the map of the first indoor area prior to the hand-held computing device transiting through the first portal;
- show location of the hand-held computing device on the map of the first outdoor area; and
- provide navigation information using only the first data associated with the first indoor area.

20. A hand-held computing device comprising:
a processor;
a memory coupled to the processor;
a display device electrically coupled to the processor;
a wireless communication system electrically coupled to the processor, the wireless communication system configured to receive location information wirelessly from lodestar devices external to the hand-held computing device;
a global positioning system (GPS) receiver coupled to the processor, the GPS receiver configured to receive signals from GPS satellites and determine location of the hand-held computing device;
the memory stores a program that, when executed by the processor, causes the processor to:
- receive first data associated with first beacon devices associated with a first indoor area;
- receive second data associated with GPS signals associated with a first outdoor area;
- deduce that the hand-held computing device resides within the first indoor area;
- determine that the hand-held computing device is approaching a first portal between the first indoor area and the first outdoor area, the determination based on signals received by the wireless communication system;
- display on a display device a first merged map concatenating a map of the first indoor area with a map of the first outdoor area;
- show location of the hand-held computing device on the map of the first indoor area prior to the hand-held computing device transiting through the first portal;
- show location of the hand-held computing device on the map of the first outdoor area; and
- refrain from providing navigation information.

21. A computer-implemented method, the method comprising:
- receiving, by a processor of a mobile device, first data associated with first lodestar devices associated with a first navigation domain;
- receiving, by the processor of the mobile device, second data associated with second lodestar devices associated with a second navigation domain;
- deducing, by the processor of the mobile device, that the mobile device resides within the first navigation domain based on exception data within the first data; and
- providing, by the processor of the mobile device, navigation information using only the first data associated with the first lodestar devices.

22. A computer-implemented method, the method comprising:
- receiving, by a processor of a mobile device, first data associated with first lodestar devices associated with a first navigation domain;
- receiving, by the processor of the mobile device, second data associated with second lodestar devices associated with a second navigation domain;
- deducing, by the processor of the mobile device, that the mobile device resides within the first navigation domain based on exception data within the first data; and
- refraining from providing navigation information.

23. A computer-implemented method comprising:
- receiving, by a processor of a mobile device, first data associated with first lodestar devices associated with a first navigation domain;
- receiving, by the processor of the mobile device, second data associated with second lodestar devices associated with a second navigation domain; and
- deducing, by the processor of the mobile device, that the mobile device resides within the first navigation domain by:
- downloading, by the processor of the mobile device, map data associated with the first navigation domain;
- calculating, by the processor of the mobile device, a location relative to at least one of the first lodestar devices;
- analyzing the location in reference to the map data to deduce that the mobile device is within the first navigation domain; and
- providing, by the processor of the mobile device, navigation information using only the first data associated with the first lodestar devices.

24. A computer-implemented method comprising:
- receiving, by a processor of a mobile device, first data associated with first lodestar devices associated with a first navigation domain;
- receiving, by the processor of the mobile device, second data associated with second lodestar devices associated with a second navigation domain; and
- deducing, by the processor of the mobile device, that the mobile device resides within the first navigation domain by:
- downloading, by the processor of the mobile device, map data associated with the first navigation domain;
- calculating, by the processor of the mobile device, a location relative to at least one of the first lodestar devices;
- analyzing the location in reference to the map data to deduce that the mobile device is within the first navigation domain; and
- refraining from providing navigation information.

* * * * *